United States Patent
Yada et al.

(10) Patent No.: US 7,177,528 B1
(45) Date of Patent: Feb. 13, 2007

(54) DISK DRIVE APPARATUS, AND DATA PROCESSING METHOD FOR USE WITH DISK DRIVE APPARATUS

(75) Inventors: Hiroaki Yada, Kanagawa (JP); Keitaro Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1170 days.

(21) Appl. No.: 09/632,200

(22) Filed: Aug. 2, 2000

(30) Foreign Application Priority Data

Aug. 3, 1999 (JP) ............................... 11-220373

(51) Int. Cl.
  *H04N 11/00* (2006.01)
  *H04N 7/26* (2006.01)
  *H04N 5/91* (2006.01)

(52) U.S. Cl. .......................... 386/111; 386/1; 386/95; 386/96

(58) Field of Classification Search ................. 386/45, 386/125–126, 96, 106–107, 120, 123, 98, 386/104, 117, 94, 95, 1, 111; 360/246.1; 369/47.14, 44.27; 455/517
See application file for complete search history.

(56) References Cited

U.S. PATENT DOCUMENTS

| | | | | |
|---|---|---|---|---|
| 5,278,712 A | * | 1/1994 | Sugaya | .................... 360/246.1 |
| 5,612,933 A | * | 3/1997 | Iso et al. | ................. 369/44.27 |
| 5,914,928 A | * | 6/1999 | Takahashi | ................. 369/47.14 |
| 6,075,688 A | * | 6/2000 | Willard et al. | ................. 361/92 |
| 6,192,191 B1 | * | 2/2001 | Suga et al. | .................. 386/120 |
| 6,363,211 B1 | * | 3/2002 | Kanota et al. | ................. 386/96 |
| 6,405,049 B2 | * | 6/2002 | Herrod et al. | ............... 455/517 |
| 6,405,409 B1 | * | 6/2002 | Zirella | .......................... 16/421 |
| 6,658,202 B1 | * | 12/2003 | Battaglia et al. | ............. 386/117 |
| 2001/0017978 A1 | * | 8/2001 | Nagasawa | .................... 386/111 |
| 2004/0208482 A1 | * | 10/2004 | Suga et al. | .................... 386/95 |

* cited by examiner

*Primary Examiner*—Thai Q. Tran
*Assistant Examiner*—Jamie Vent
(74) *Attorney, Agent, or Firm*—Frommer Lawrence & Haug LLP; William S. Frommer; Thomas F. Presson

(57) ABSTRACT

A disk drive apparatus is provided which is capable of performing recording and playback processing of an AV data stream requiring real-time characteristics and processing in an operation mode suitable for battery driving. The construction is formed in such a way that a first operation mode in which a disk rotation speed is set to be low, to which error handling in which an upper limit of an error handling time is determined as an error processing method suitable for performing recording or playback of real-time continuous information is made to correspond, and a second operation mode in which the disk rotation speed is set to be high and in which retries can be performed repeatedly as an error processing method suitable for performing recording or playback of data having high reliability, can be set. Thus, lower power consumption of real-time continuous data processing in image recording and playback by battery driving, such as in a portable video camera, is realized.

18 Claims, 11 Drawing Sheets

DISK DRIVE APPARATUS, AND DATA PROCESSING METHOD FOR USE WITH DISK DRIVE APPARATUS

BACKGROUND OF THE INVENTION

1. Field of the Invention

The present invention relates to a disk drive apparatus, a video camera apparatus, and a processing method for use with the disk drive apparatus for recording and playing back various types of data, including computer data and, in particular, to a disk drive apparatus capable of performing random access. More particularly, the present invention relates to a disk drive apparatus of a type which is installed and used in a host, such as a computer system or a portable video camera and, in particular, to a disk drive apparatus, a video camera apparatus, and a data processing method for use with the disk drive apparatus for recording and playing back computer data requiring data reliability, as well as video data and audio data requiring real-time characteristics.

2. Description of the Related Art

Various types of information processing systems, including general-purpose computers, have mounted therein a data recording and playback apparatus for storing large application software and large amounts of data in a non-volatile state. There are various recording and playback apparatuses, such as disk types, which hold data on a rotating disk, and tape types, which hold data on a winding-type tape. Of these, the disk-type recording and playback apparatus is superior in that random access is possible.

A typical disk apparatus is a hard disk drive (HDD). With advances in magnetic head technology and signal processing technology, the increased capacity of HDDs is remarkable. For example, in the period from about 1990 to the present, the recording density per unit area has continuously increased annually by about 60%. It is expected that 10 to 20 GB of data will be recordable on a 3.5-inch diameter disk sometime after 2000. That is, it is believed that one HDD having a plurality of disks will have a recording capacity exceeding 100 GB.

As described above, since an HDD has a large capacity, it is suitable for recording digital image information. On the other hand, with advances in recent image compression technology, the average data rate necessary for recording an image is progressively decreasing. For example, in the case of the MPEG2 (Motion Picture Experts Group Phase 2) standard which is predicted to be further used in the future in personal computers and digital satellite broadcasts, a moving image having satisfactory quality at an average data rate of approximately 4 to 8 Mbits/sec can be recorded and played back.

On the other hand, generally, there has been a demand for an HDD for use in computers to be constructed so as to realize a higher speed of data access. In a case where compressed moving-image data is recorded or played back in an HDD which is designed by assuming such computer uses, the data rate is higher than is necessary even if the head movement time between concentric recording tracks is taken into consideration. In other words, to record and play back compressed moving-image data in an HDD for use in computers, the disk rotation speed is higher than necessary, unfortunately causing a problem of large power consumption by the spindle motor or rotation noise arising from high-speed rotation.

One typical mode of a moving-image recording system is a portable video camera. Since a portable apparatus, such as a video camera, is battery-driven, reduction in power consumption is crucial to achieve extension of operation period.

As a conventional method for achieving a high speed at connection time to a computer while ensuring low power consumption during portable use, a magnetic disk playback method having a plurality of different operation modes of at least two of a low-speed mode and a high-speed mode is disclosed in Japanese Unexamined Patent Application Publication No. 10-162483, which is an application for patent by the same applicant as that of this application. A disk apparatus which uses a synchronization servo method as a head positioning servo method suitable for realizing a plurality of rotation speeds and which records image information and sound information, in particular, in a low-speed mode, is disclosed in Japanese Unexamined Patent Application Publication No. 10-261357, which is an application for patent also by the same applicant as that of this application.

Generally, in an HDD, one data file is discretely recorded and played back by being divided in packet units called data sectors, and error handling during recording and playback is also performed for each data sector. The disk of an HDD is generally rotating at a constant angular velocity (CAV), and the data rate differs depending on the data recording radius. Therefore, in order to ensure real-time continuity in recording and playback of image information and sound information, it is necessary for the average data rate in discrete recording and playback of data sectors to be higher than the data rate for the image and sound information.

If an extended period is spent on error handling for recording and playback of one data sector, the average data rate falls below a required level, and the continuity of image and sound information may be lost. In particular, in a case where the number of revolutions of the disk is reduced to lower consumption of the power, since there is no allowance for the data rate, this problem is likely to occur. However, since the occurrence of various errors is a probability phenomenon, and the error varies due to the use state and the use history on the HDDs, it is difficult to anticipate them completely at the time of design. Furthermore, in a conventional HDD, if an error occurs once, full use of the best technique available, such as correction and re-reading by error correction code, is made to read correctly, causing the error handling time to become prolonged. Therefore, there is a problem in that it is difficult to ensure real-time characteristics at the time of design.

As one of the error handling modes, which are factors hindering the ensuring of real-time characteristics, a processing operation for a retry may be mentioned. The recording and playback of data in an HDD are performed in units (for example, units of 512 bytes) of a short data sector corresponding to a packet in communication technology. The retry is an operation such that the same operation is performed again when an error occurs in a step of executing a command, such as recording and playback of data sectors, supplied from a host.

There are various types of causes of error which result in retries. First, an error in head movement (seek) to a target sector is cited. To overcome a seek error, the recording and playback of the target sector is abandoned and skipped, or a retry must be performed. Since a waste of time of approximately several msec to several tens of msec is necessary for one retry, this becomes a factor hindering real-time characteristics.

Next, there is a retry (write retry) during data recording. In a case where it is detected that the position variation of a head from a data track exceeds a permissible amount, for example, due to a mechanical impact applied from outside the HDD while recording on one data sector is being performed, the recording operation is stopped. Thereafter, after awaiting the recovery of the head position variation to a normal state and the reaching of the subject sector directly below the head again as a result of the disk rotation, a data recording operation on the subject data sector is performed again (write retry).

Furthermore, in a case where an error in an amount exceeding correction performance by an ECC (Error-Correction Code) added to a sector occurs when one data sector is played back in a retry (read retry) during data playback and it is determined that correction is impossible, after awaiting the reaching of the subject sector directly below the head again as a result of the disk rotation, a playback operation of the subject logical sector is performed again (read retry). In addition, in a case where it is determined again that correction is impossible even if a read retry is performed once, a second read retry is performed. In a case where an error is not a soft error due to a random cause, such as noise, but is an error due to a definite cause, such as a scratch in the magnetic film on the disk, the disk cannot be read correctly even if read retries are performed, for example, 10 or more times, and a waste of time of 100 msec or more is necessary, fatally hindering the ensuring of real-time characteristics.

Since the maximum number of times the above various retries are executed and other error handling methods are conventionally fixed by HDD design, it is not possible to appropriately perform control according to the state of the entire disk recorder.

Also, although a means for completely permitting or prohibiting the execution of a retry is conventionally provided (for example, part of the ATA (AT-Attachment) interface standard prepared by the ANSI (American National Standards Institute), a means for appropriately setting a maximum permissible time required for error handling, and a means for dynamically performing control according to the urgency (that is, demand for real-time characteristics) of recording and playback are not provided.

In the manner as described above, there is generally a demand for an HDD to perform high-speed access and an accurate recording and playback process in computer uses, while in moving-image data processing, real-time characteristics are important. Furthermore, in moving-image data processing using a portable video camera, there is the problem of minimizing power consumption. Although the minimization of power consumption can be realized by decreasing the rotation speed of the HDD, if a prolonged period is spent on error handling by decreasing the number of revolutions of a disk, continuity of image information and sound information is lost.

SUMMARY OF THE INVENTION

The present invention has been achieved in view of such drawbacks in the conventional technology. An object of the present invention is to provide a disk drive apparatus, a video camera apparatus, and a data processing method for use with the disk drive apparatus, in which a plurality of two or more operation modes of a portable AV mode (PAV) as an operation mode which is most appropriate when an HDD is used in a portable audio-visual apparatus during battery use, and a home IT (Information Technology) mode (HIT) as a mode appropriate for handling data, such as computer data, requiring high reliability during commercial-power use are provided, so that not only the rotation speed of the disk, but also the error handling mode during data recording and playback is changed by switching the modes, whereby high-speed access and high reliability are realized during the processing of the computer data, and real-time characteristics are ensured and low power consumption is realized in moving-image data processing during battery use.

To achieve the above-mentioned object, according to a first aspect, the present invention provides a disk drive apparatus having a plurality of operation modes, wherein the plurality of operation modes include a plurality of operation modes in which disk rotation speeds are different, and the plurality of operation modes include a plurality of operation modes in which error handling modes during recording and playback of data are different.

The disk drive apparatus may have a first operation mode in which a disk rotation speed is set to be low, to which an error handling method appropriate for performing recording or playback of real-time continuous information is made to correspond; and a second operation mode in which a disk rotation speed is set to be high, to which an error handling method appropriate for performing recording or playback of data with high reliability is made to correspond.

An error handling method in the first operation mode is preferably an error handling method in which an upper limit of an error handling time for realizing recording or playback of real-time continuous information is determined, and an error handling method in the second operation mode is preferably an error handling method in which an error handling time longer than the upper limit of the error handling time in the first operation mode is permitted.

In the first operation mode, when error handling is not completed within the upper limit of the error handling time, the error handling is stopped, and the recording or playback process for data which follows is performed.

The upper limit of the error handling time can be set.

The disk drive apparatus may have a third operation mode in which a disk rotation speed is set to be high, to which an error handling method appropriate for performing recording or playback of real-time continuous information is made to correspond.

The disk drive apparatus may have a fourth operation mode in which a disk rotation speed is set to be low, to which an error handling method appropriate for performing recording or playback of data with high reliability is made to correspond.

The disk drive apparatus can preferably be battery driven, and when the disk drive apparatus is battery driven, the disk drive apparatus operates in an operation mode in which the disk rotation speed is low.

The disk drive apparatus can preferably be connected to a host system via a host interface, performs a recording or playback operation onto or from a disk in accordance with a recording or playback command received via the host interface, and switches among different operation modes in accordance with a command including operation mode specification, which is received via the host interface.

The command containing the operation mode specification is a command added in accordance with the ATA (AT-Attachment) standard prepared by the ANSI (American National Standards Institute).

The command containing the operation mode specification is a command added in accordance with the PC card ATA (AT-Attachment) standard defined by the PCMCIA (Personal Memory Card International Association)/JEIDA (Japan Electronics Industry Development Association).

The disk drive apparatus is preferably a removable-disk apparatus from which a mounted disk can be removed.

The outer dimensions and the connector construction of the disk drive apparatus are preferably in compliance with the PC card standard defined by the PCMCIA/JEIDA.

The disk drive apparatus may perform positioning control of a head with respect to a disk on the basis of servo information in accordance with a sector servo method of sectors provided radially by partitioning the data recording surface of the disk.

The disk drive apparatus preferably has a synchronous head position detection construction for generating a servo clock on the basis of the servo information recording area and for detecting head position information while referring to the generated clock.

The disk drive apparatus may comprise an information compression unit for compressing information, and an information decompression unit for decompressing compressed information. Information compressed by the information compression unit is recorded on a disk mounted in the disk drive apparatus, and when compressed information is played back from the disk, a decompression process for decompressing information is performed by the information decompression unit.

Information compressed by the information compression unit preferably contains moving-image information.

The moving-image information is preferably continuous image information compressed by the MPEG2 (Motion Picture Experts Group Phase 2) method.

The disk drive apparatus preferably has a camera for photographing an image, and the image information obtained by the camera is recorded on a disk loaded in the disk drive apparatus.

According to a second aspect, the present invention provides a video camera apparatus comprising a disk drive apparatus having a plurality of operation modes, wherein the plurality of operation modes include a plurality of operation modes in which disk rotation speeds are different, and the plurality of operation modes include a plurality of operation modes in which error handling modes at the time of recording or playback of data are different.

The video camera apparatus may comprise a disk drive apparatus having a first operation mode in which a disk rotation speed is set to be low, to which an error handling method appropriate for performing recording or playback of real-time continuous information is made to correspond; and a second operation mode in which a disk rotation speed is set to be high, to which an error handling method appropriate for performing recording or playback of data with high reliability is made to correspond.

According to a third aspect, the present invention provides a data processing method for use with a disk drive apparatus having a plurality of operation modes, the data processing method comprising: setting to a first operation mode in which a disk rotation speed is set to be low on the basis of mode information contained in a command received by the disk drive apparatus, to which an error handling method appropriate for performing recording or playback of real-time continuous information is made to correspond; and measuring the duration of error handling for an error which occurs at the time of recording or playback of data onto and from a disk, and when the error handling is not terminated within the upper limit of the time contained in the command, stopping the error handling and performing a recording or playback process for data which follows.

The disk drive apparatus in accordance with each aspect of the present invention is connected to a host system outside the apparatus and is used via a PC card interface in compliance with the PC card standard defined by the PCMCIA/JEIDA or a host interface in compliance with the ATA (AT-Attachment) interface standard prepared by the ANSI (American National Standards Institute). One example of the host system is a portable video camera as a digital moving-image disk recorder which records and plays back a data stream, such as video and audio, to and from the disk apparatus, and another example is a general-purpose computer system. In the host system, it is preferable that a command set be prepared which can be processed by the disk apparatus in an operation mode in which the error handling time is limited to less than a predetermined permissible value.

The present invention has been achieved by taking note of the point that demands for data reliability and real-time characteristics vary according to the type of data handled by an HDD.

For example, in order that the HDD handle computer data, ensuring of the reliability of the data is critical. Computer data containing an error is completely meaningless for computer processing, and errors must be rectified even if processing time is required.

In contrast, in a case where the HDD handles AV data, the primary purpose is to record and play back data in real time, and the reliability of data can be compromised to some degree. The reason for this is that even if a certain number of errors are mixed in data and the played-back contents of video and audio are distorted to some degree, human visual and auditory sense can ignore or compensate this. However, if the real-time characteristics are not maintained and video and audio are interrupted, ignoring or compensation is impossible, and service quality is degraded considerably.

The disk drive apparatus (hereinafter also referred to simply as a "disk apparatus") of the present invention has an operation mode appropriate for recording or playing back continuous information in addition to an operation mode appropriate for recording or playing back non-continuous (that is, discrete) information. The operation mode of the former is suitable for handling data, such as computer data, requiring high reliability, and is hereinafter called an "IT (Information Technology) mode". Also, the operation mode of the latter is suitable for handling data, such as moving-image data and sound data, requiring real-time characteristics, and is hereinafter called an "AV (Audio Visual) mode".

Furthermore, the disk apparatus of the present invention has a home mode and a portable mode, for which the disk rotation speeds are different. The home mode is a mode in which the disk rotation speed is set to be high, and ensuring of a high-speed data rate is possible, and is a mode suitable for computer data processing when commercial power is used. The portable mode is a mode in which the disk rotation speed is decreased and is suitable for use when reduction in power consumption is desired for battery driving. Also, the portable mode is a mode suitable for a process for recording or playing back image information and sound information, for which satisfactory processing is possible at a low data transfer rate. The disk apparatus of the present invention is constructed so as to be driven by an operation mode in which the above-described IT mode and the above-described AV mode are combined with the home mode and the portable mode.

The disk apparatus of the present invention can be connected via a PC card interface to a "host", such as a general-purpose computer and a portable digital video camera as a digital disk camera. Furthermore, this disk apparatus is provided with a means for switching among operation modes via this PC card interface, and a means for changing the disk rotation speed in response to this switching of the operation modes and for setting an error-handling time permissible value at the time of recording or playback. Therefore, the error-handling time permissible value is set dynamically according to whether the disk apparatus is in an IT mode appropriate for discrete information requiring high reliability and in an AV mode appropriate for continuous information requiring real-time characteristics.

The above and further objects, aspects and novel features of the invention will become more fully apparent from the following detailed description when read in conjunction with the accompanying drawings.

DESCRIPTION OF THE PREFERRED EMBODIMENTS

Embodiments of a disk drive apparatus, a video camera apparatus, and a data processing method for use with the disk drive apparatus, to which the present invention is applied, are described below. Although in an embodiment to be described below, a fixed-type hard disk apparatus (HDD) is described having the shape of the PC card standard as a typical example, the present invention is not necessarily limited to this type. It is a matter of course that, for example, the present invention may similarly apply to other magnetic disk apparatuses, such as a removable HDD from which a disk as a recording medium can be changed, a floppy disk apparatus (FDD), or an optical disk apparatus. Also, it is to be understood that the present invention may similarly be applied to an optical hard disk apparatus in which a floating slider is combined with an optical disk.

Figure 1:
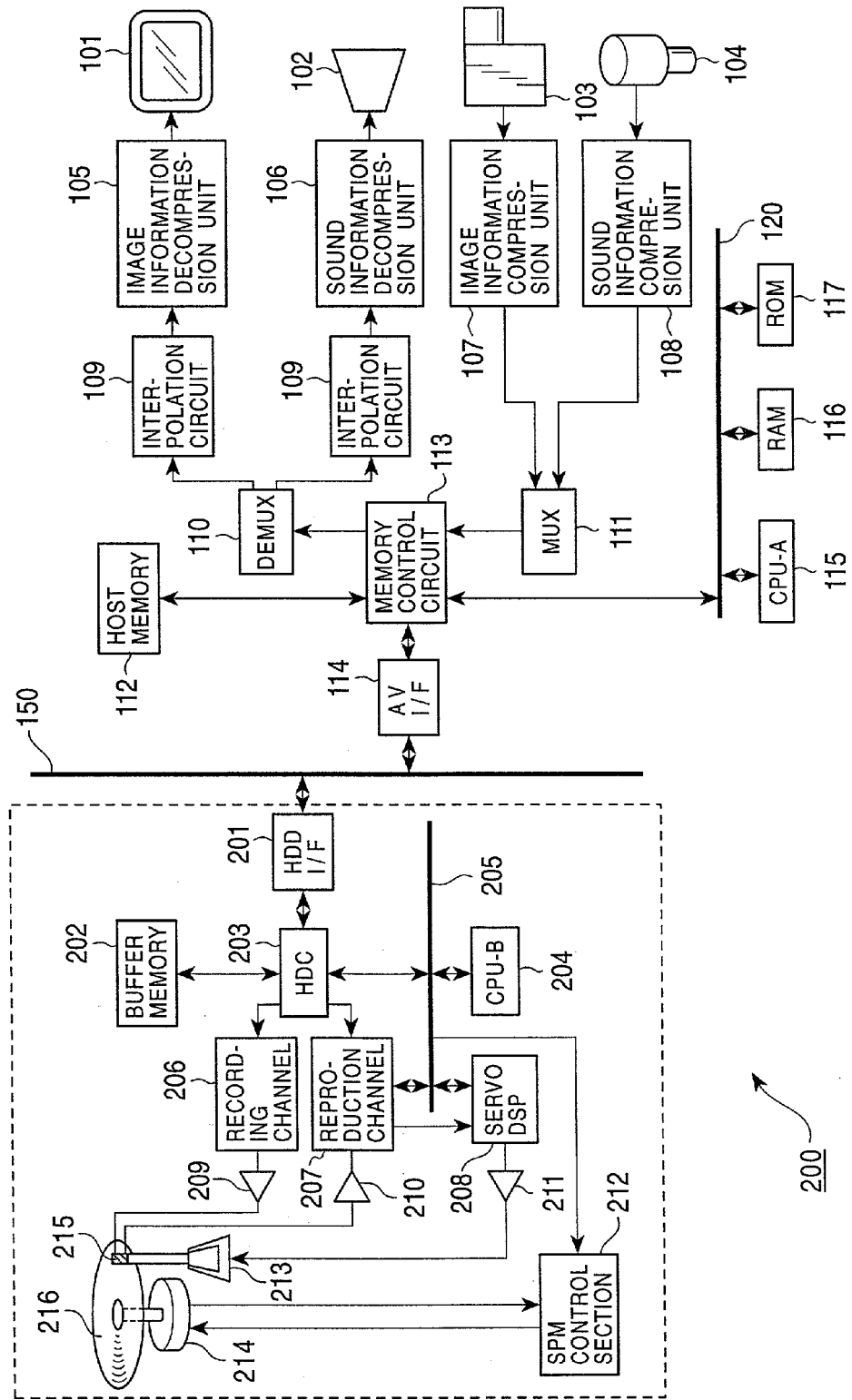
FIG. 1 is a diagram schematically showing the hardware construction of a digital moving-image disk system having mounted therein an HDD 200 as a recording medium according to an embodiment of a disk drive apparatus of the present invention.

FIG. 1 is a diagram schematically showing the hardware construction of a digital disk camera having mounted therein a PC-card-type HDD 200 as a recording medium according to an embodiment of the present invention. The digital disk camera can record or reproduce video information and audio information for a still image and a moving image. The construction of the digital disk camera shown in FIG. 1 and the flow of signals are described below.

First, a description is given of the flow of signals at the time of data recording using a camera 103 in a digital disk camera using the PC-card-type HDD 200 shown in FIG. 1. The video information converted into electrical signals by the camera 103 is digitized, after which the information is compressed by an image information compression unit 107 so that the data rate becomes approximately ⅕. As methods for image information compression, DV, MPEG2, etc., are used in practice. In this type of compression method, by performing a discrete cosine transform, inter-frame movement detection, requantization, two-dimensional Huffman coding, etc., on the original digital video information, the amount of information is compressed. An acoustic signal picked up by a microphone 104 at the same time as an image signal is also digitized, and the data rate is reduced by a sound information compression unit 108. The compressed video information and audio information are multiplexed by a multiplexer (MUX) 111, and are assembled as an AV data stream.

In the digital disk camera shown in FIG. 1, the overall operation of the system is centrally controlled by a CPU-A 115. The CPU-A 115 operates in accordance with firmware stored permanently in a ROM (Read Only Memory) 117, and uses a RAM (Random Access Memory) 116, which is a rewritable memory, as a work area.

Also, a digital moving-image disk recorder comprises a user interface mechanism (not shown) for receiving operation instructions to the recorder from a user. The user interface mechanism is formed of, for example, operation switches/buttons, a remote control unit, a keyboard, a liquid-crystal display device, etc.

User input/output through the user interface mechanism is controlled by the CPU-A 115 (more specifically, the firmware executed by the CPU-A 115). The user input/output includes instructions of recording or playback of a moving image and sound data by the HDD 200. The user instruction input to the HDD 200 is realized by the CPU-A 115 by issuing a command to a PC-card interface 150 via a CPU-A bus 120 and an AV-I/F 114. Also, data transfer between a host and the HDD 200 is performed by the CPU-A 115 by issuing an instruction command to a memory control circuit 113 and the AV-I/F 114. On the host side, data to be transferred is not directly exchanged with the HDD 200, and the data is stored once in a host memory 112.

Figure 2:
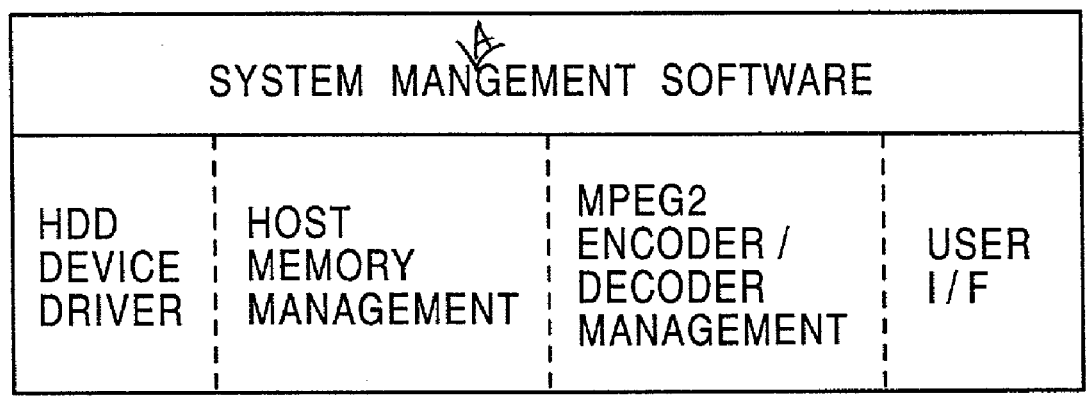
FIG. 2 is a diagram schematically showing the hierarchical structure of firmware executed by a CPU-A 115 shown in FIG. 1.

FIG. 2 shows an example of the software structure of the CPU-A 115, stored in the ROM 16. The entirety thereof is controlled by system management software. The system management software contains all of the functions necessary for a recorder, which are not contained in the lower layer, such as instructions and management of recording and playback operations, the understanding and management of the operating state of each of the hardware resources, such as the PC-card-type HDD (hereinafter referred to as a "HDD") 200 and the host memory 112.

The MPEG2 encoder and decoder operation management software shown in the lower layer of FIG. 2 controls the image information compression unit 107, the sound information compression unit 108, the MUX 111, an image information decompression unit 105, a sound information decompression unit 106, and a DEMUX 110, so that a process for compressing each item of information of moving-image data and sound data and assembling an AV data stream is controlled, or a process for decompressing an AV data stream into a moving image and sound information is controlled. Here, a description is given of an example in which the MPEG2 method is used as a video information compression method.

The host memory management software instructs the memory control circuit 113 so as to control data writing into and data reading from the host memory 112, so that an operation is performed for dividing an AV data stream to be recorded into units of clusters (to be described later) and for sending them to the HDD 200, and during playback, an operation for assembling data read from the HDD 200 in units of clusters into an AV stream and sending it to a group of decoders is controlled.

The HDD device driver is software which issues various commands in practice to the HDD 200 via the PC-card interface 150 so as to control data recording and playback. The user I/F section performs an input/output operation in the user interface mechanism.

The data rate of the AV data stream is approximately 4 to 8 Mbits/sec in a case where the MPEG2 method is used as a video compression method.

Figure 3:
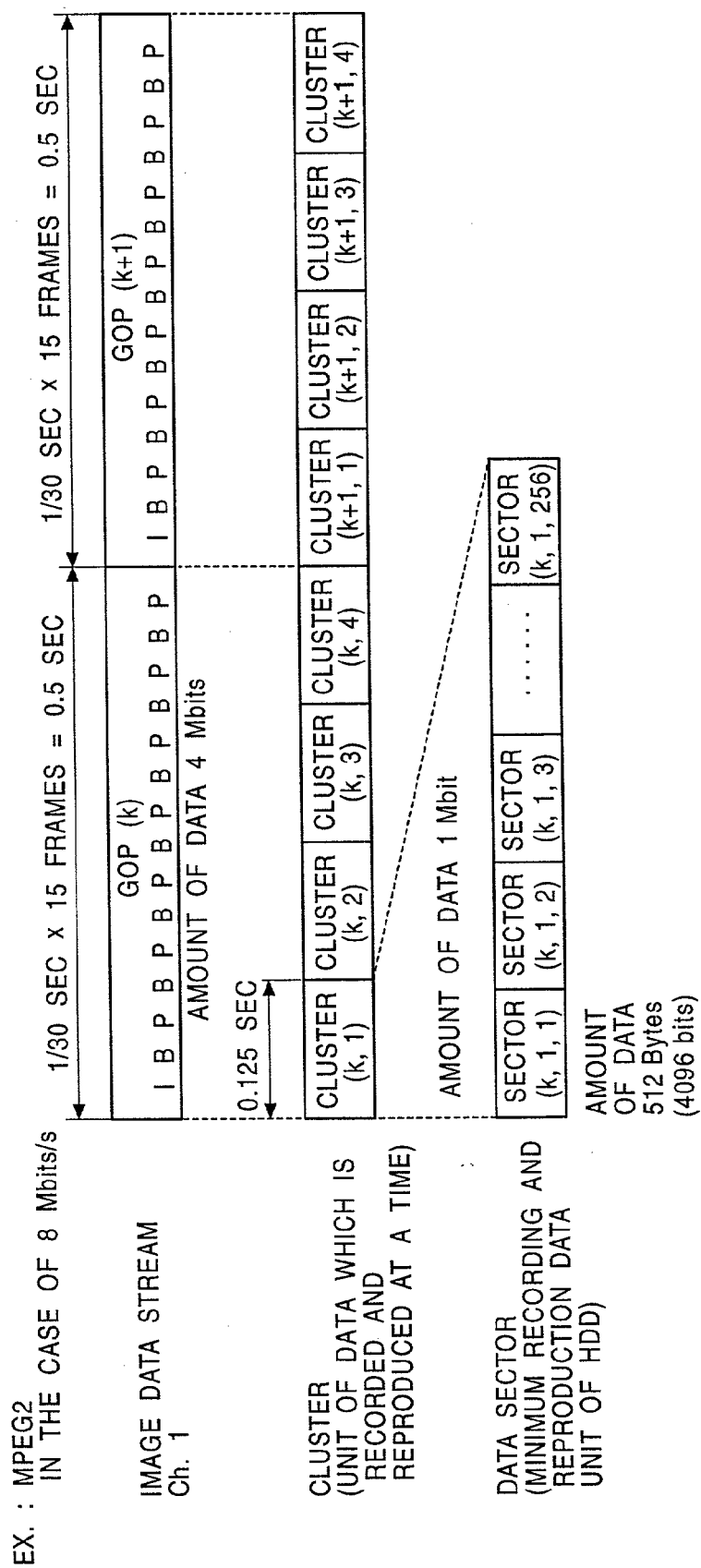
FIG. 3 is a diagram schematically showing a relationship between clusters which are units of recording and playback of data to and from the HDD 200, and a GOP (Group of Pictures) defined as a data stream of MPEG2.

FIG. 3 schematically shows a relationship between clusters which are units of recording and playback of data to and from the HDD 200, and a GOP (Group of Pictures) defined as a data stream of MPEG2.

As shown in FIG. 3, this AV data stream is formed of a GOP (Group of Pictures) which is completed with and composed of 15 frames of an image. One GOP stored in the host memory 112 is further divided into data units of a predetermined amount, called clusters, by the CPU-A 115, and these are recorded in the HDD 200 via the PC card interface.

As shown in FIG. 3, one GOP is formed of an image of 15 continuous frames composed of I pictures, B pictures, and P pictures. In the example shown in FIG. 3, a cluster is a mass of data obtained by dividing the GOP by four. Since one frame corresponds to 1/30 second, one GOP corresponds to 0.5 second. Also, since the amount of data of the GOP is 4 Mbits, the cluster size obtained by dividing the data stream for one second by eight is 1 Mbit.

Since the sector size of an ordinary HDD in the computer industry is 512 bytes (that is, 4,096 bits), one cluster corresponds to the amount of data for approximately 245 sectors. That is, in the HDD, each time a recording command is received from the host, approximately 245 sectors are recorded continuously.

The flow of a recording operation can be summarized as described below. That is, an AV data stream is sequentially recorded once in the host memory 112 through the memory control circuit 113. The CPU-A 115 issues an instruction to the memory control circuit 113 in accordance with the control of the host memory management software within the firmware, so that data to be recorded into the HDD 200, that is, clusters, is read from the host memory 112, and the data is transmitted to the HDD 200 via the AV-I/F 114 and the PC-card interface 150.

The details of the recording operation are described below. The CPU-A 115 sends a host command (a recording command in this case) to the HDD 200, so that recording of one cluster to be recorded is started from a particular logic block address (LBA) on a disk 216 as a data block of a particular predetermined length.

A hard disk controller (hereinafter referred to as a "HDC") 203 inside the HDD 200 comprises an input register for receiving data and commands from a host, and an output register for returning data, status inside the HDD 200, etc., to the host. When a recording command is received from the host, the HDC 203 converts the logic block address (LBA) specified by the recording command into a physical address (the physical address is specified by, for example, a disk face number, a track number, a sector number, etc.) inside the HDD 200 by a cooperative operation with a CPU-B 204.

Then, the cluster sent from the host memory 112 is received by the input register of the HDC 203 via the PC-card interface 150 and is stored once in a buffer memory 2.02. One cluster has an amount of data (described above), for example, for 245 sectors. The HDC 203 divides this received data into a length (512 bytes) of a logic data sector which is set on the track of the disk 216, and further adds a preamble pattern for obtaining bit synchronization at the time of reading and an error-correction code in portions preceding and subsequent thereto so as to form a data sector, after which the HDC 203 sends the data sector to a recording channel circuit 206 while in synchronization with the disk rotation.

The recording channel circuit 206 performs channel coding on a data sector so as to be converted into a binary sequence compatible with the characteristics of a magnetic recording channel formed of a head 215 and the disk 216. This binary sequence is made to correspond to a rectangular recording current waveform by a recording amplifier 209, and is recorded as an inverted magnetization pattern on the magnetic disk 216 by the head 215.

Here, since the head 215 must be positioned in advance on a target track which is the target for recording, a servo control circuit (servo DSP) 208 receiving a target track number from the HDC 203 and the CPU-B 204 causes the head 215 to move to the physical address of the disk 216 while receiving a track number on the surface of the disk 216 from a reproduction channel circuit 207 so as to perform positioning.

Figure 4:
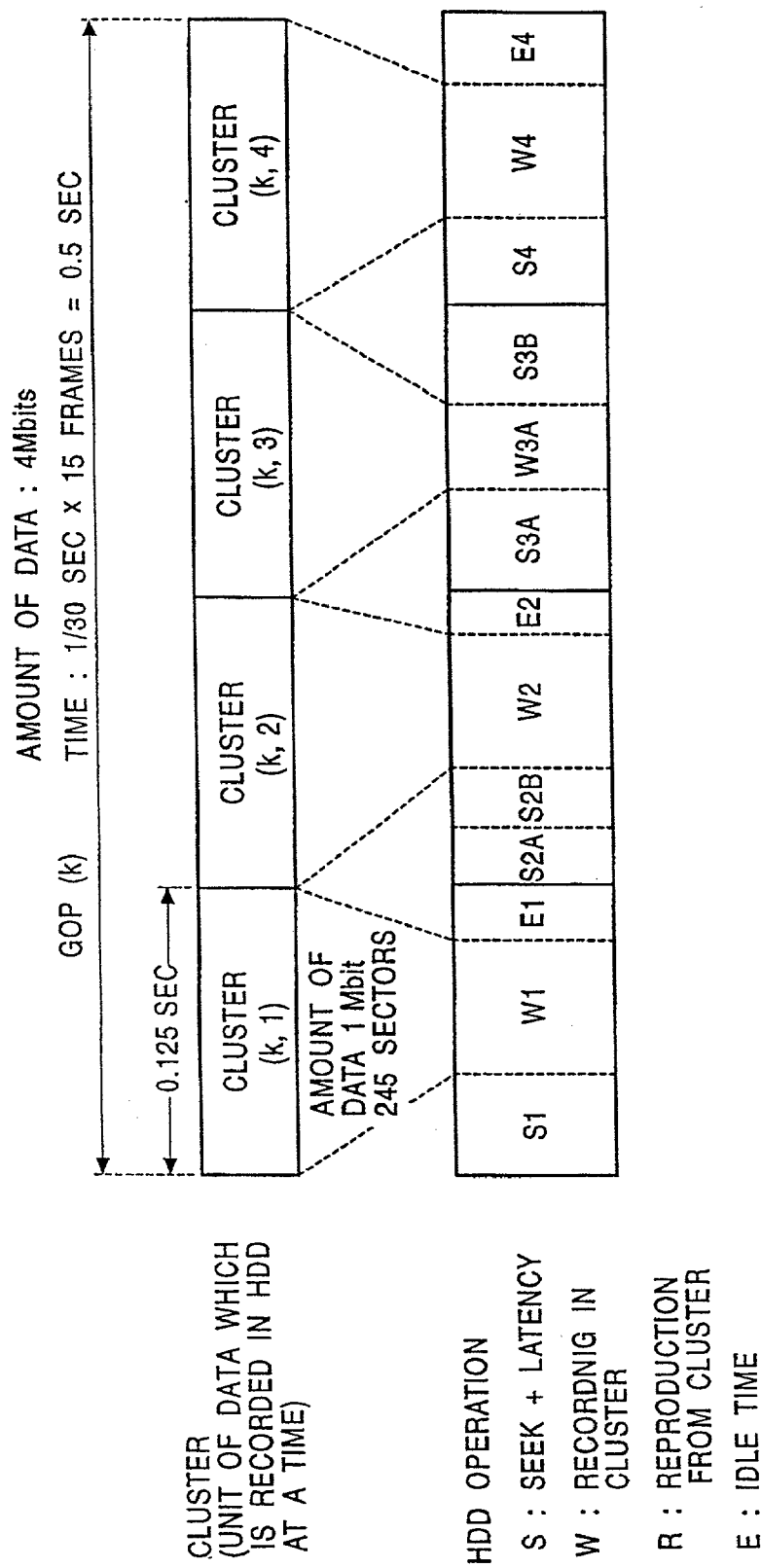
FIG. 4 is a timing chart showing an example of the operation of the HDD 200 in a case where one AV data stream is recorded.

FIG. 4 shows an example of the operation of an HDD in a case where one AV data stream is recorded on the HDD. As shown in FIG. 4, the time which can be used for recording one cluster is 125 msec. The time necessary for the seek, a rotation latency operation (S1), and a recording operation (W1) of the HDD 200 is approximately 30 msec, depending on the speed performance of the HDD. The remaining time (125−S1−W1) is the remaining time (E). In FIG. 4, in practice, since there is a delay time between the AV data stream in the upper portion and the HDD operation in the lower portion, the cause-and-effect relationship between them is satisfied. The operation of the HDD at the time of recording of each cluster (k, n) shown in the middle portion of FIG. 4 is an operation example in the PAV mode (to be described later) in the disk apparatus of the present invention, and the details of this operation will be described later.

Next, the flow of signals at the time of playback is described. First, the system management software (described above) causes the HDD device driver to issue a reading command so as to specify the AV data stream name to be played back in accordance with user input information from the user I/F section of the firmware, to determine the logic block address (LBA) at which each cluster which is a constituent of the stream is recorded, and to read the corresponding cluster. Also, at the same time as issuing of this command, the host memory management software causes a storage area for reconstructing the read cluster to be allocated on the host memory 112 through the memory control circuit 113.

The reading command is given to the CPU-B 204 inside the HDD 200 via the HDC 203. This CPU-B 204 converts the logic block address (LBA) of the corresponding cluster into a physical address (the physical address is specified by, for example, a disk face number, a track number, a sector number, etc.) inside the HDD 200, instructs a servo DSP 208 to cause the head 215 to move to the physical address so as to start reading the required data. That is, the inverted magnetization pattern recorded on the magnetic disk 216 is read by the head 215 and is amplified by a playback amplifier 210, after which bit synchronization is obtained by the reproduction channel signal processing circuit 207, the pattern is detected as a binary data sequence, decoding as a reverse conversion of channel coding performed at the time of recording is performed, and it is played back as a data sector.

The played back data sector is sent to the HDC 203, whereby after undergoing error-correction decoding, the data is sequentially stored in the buffer memory 202 as logical data in units of 512 bytes. Thereafter, the buffered data is sequentially transferred to the host memory 112 via the PC-card interface 150 and the memory control circuit 113, forming one cluster. Then, when reading of one cluster is completed, in a manner similar to that described above, reading of clusters which follow is instructed, and a group of data sectors are read from the HDD 200, and thus clusters which follow are formed in the host memory 112.

The formed clusters are sequentially sent from the host memory 112, and this AV data stream is separated into video data and sound data by the demultiplexer 110. In a case where an error exists in data, an interpolation process is performed on the basis of preceding and subsequent data by an interpolation circuit 109. Then, the image data is decompressed into ordinary digital image information by the image information decompression unit 105 and is output to the outside. The image information output to the outside is converted into an NTSC analog video signal by a D/A converter, etc., and is supplied to a monitor 101, etc. The sound data is decompressed by the sound information decompression unit 106 and is output to the outside by an acoustic signal output unit 102, such as a speaker.

The PC-card interface 150 uses the PC card standard defined by the PCMCIA (Personal Memory Card International Association)/JEIDA (Japan Electronics Industry Development Association) as the physical layer, and uses various protocols (PC card ATA, 68-pin ATA, True IDE) defined at an even higher layer. Since these protocols are nearly the same as the ATA (AT-Attachment) standard of the ANSI, in the following, an example is described in which 68-pin ATA which is the same as the ATA standard is used as a typical example.

A description will now be given by using, as an example, a PC-card HDD having four operation modes with regard to the outlines of the modes and mode switching of the disk drive apparatus of the present invention, and thereafter, the four modes are described individually.

[PC-Card HDD Having Four Operation Modes]

The HDD 200 in FIG. 1 is a PC-card HDD in which the outer dimensions and the interface satisfy the PC card standard, and the internal component blocks thereof are shown in FIG. 1.

This HDD 200 has a plurality of operation modes described below, in addition to conventional operation, such as sleep. In order to obtain a high track density, this HDD 200 uses what is commonly called a sector servo method in which servo information areas for head positioning control are provided nearly radially on the disk surface by partitioning the data recording tracks, and the relative position to the recording track is measured by recording/playback heads themselves.

Also, as will be described later, the plurality of operation modes of the HDD 200 contain a low-speed rotation mode in which the disk rotation speed is decreased. Therefore, use of a synchronization servo method which generates a servo clock constantly on the basis of clock information within the servo information area and which synchronously detects head position information while referring to the servo clock is convenient. The reason for this is that in this servo clock method, since the number of servo areas per circumference of a disk can be set to a high density of, for example, 100 or more areas, high head positioning accuracy can be obtained.

Next, the operation of the HDD 200 is described in detail.

The HDD 200 of this embodiment has a home mode and a portable mode, corresponding to use modes, in addition to two types of operation modes of an IT (Information Technology) mode and an AV (Audio Visual) mode corresponding to an object to be data processed, and has a total of four (2×2) types of operation modes.

The IT mode is an operation mode suitable for recording or playback of non-continuous (that is, discrete) information. More specifically, the IT mode is a mode in which nearly the same operation as that of a conventional HDD designed for recording and playback of computer data is performed, and importance is placed on the reliability of data rather than on the real-time continuity of recording and playback, and a time limitation is not imposed on error handling. That is, the IT mode is suitable for handling data requiring high reliability as computer data.

On the other hand, the AV mode of the latter is an operation mode suitable for recording or playback of continuous information. More specifically, the AV mode is a mode in which importance is placed on the real-time continuity rather than on the reliability of data in order to handle an AV data stream formed of video information and audio information, and a time limitation is imposed on error handling. That is, the AV mode is suitable for handling data requiring real-time characteristics as moving-image data and sound data.

The home mode is a mode in which the disk rotation speed is set to be high, and is a mode which ensures a high-speed data rate and which is suitable for computer data processing when commercial power is used.

The portable mode is a mode in which the disk rotation speed is set to be low and which is suitable for use in which reduction of power consumption is desired as in battery driving. Also, the portable mode is a mode which is suitable for a recording and playback process for image information and sound information, for which satisfactory processing is possible at a low data transfer rate.

Each of the four modes of the disk apparatus of the present invention is summarized as follows.

(1) HIT Mode (Home IT Mode)

A high-speed data rate is ensured by a high disk rotation speed, and error handling which places importance on data reliability is performed regardless of the time required.

(2) PIT Mode (Portable IT Mode)

The HDD 200 operates with low power consumption at a low disk rotation speed, and error handling which places importance on data reliability is performed regardless of the time required.

(3) HAV Mode (Home AV Mode)

A high-speed data rate is ensured by a high disk rotation speed, and error handling which is suitable for real-time continuous recording and playback is performed.

(4) PAV Mode (Portable AV Mode)

The HDD 200 operates with low power consumption at a low disk rotation speed, and error handling which is suitable for real-time continuous recording and playback is performed.

Figure 5:
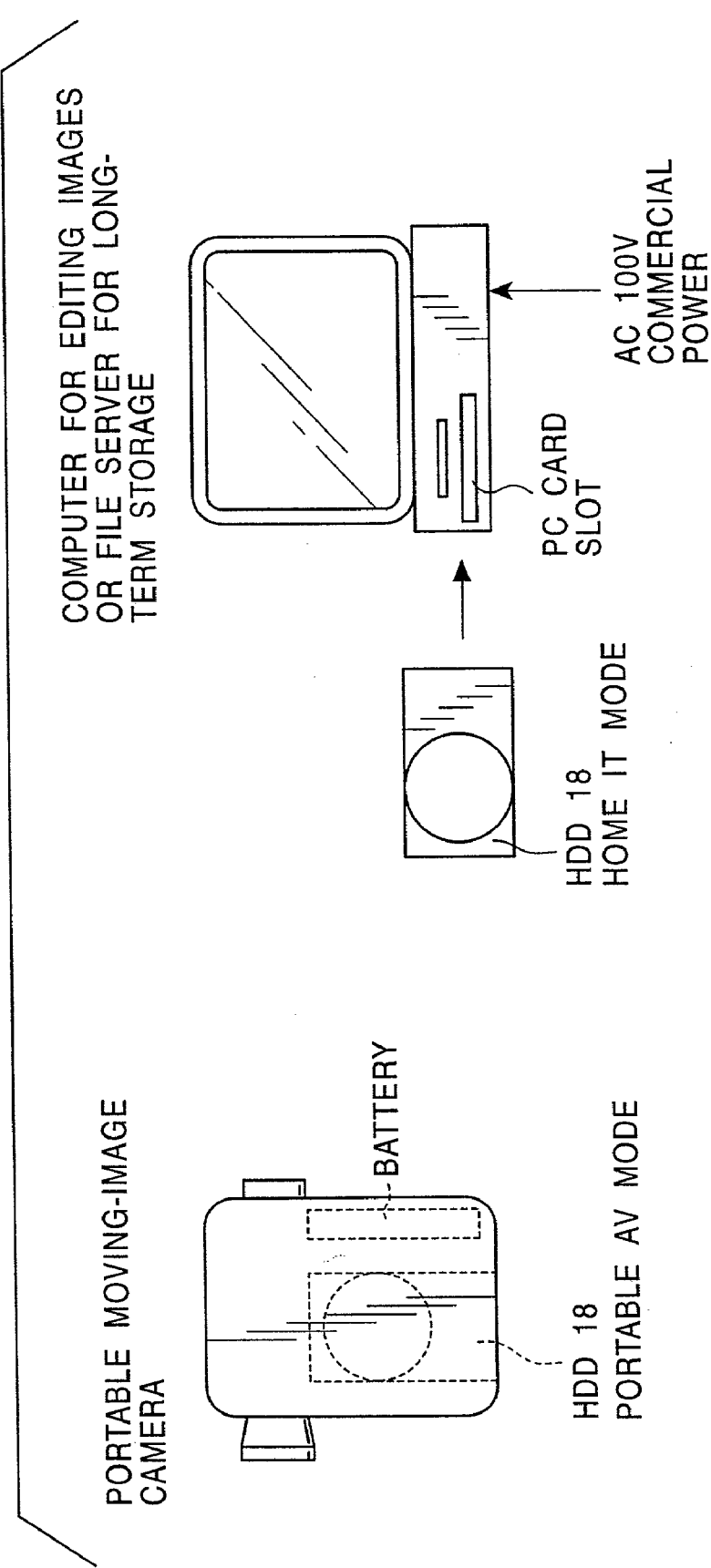
FIG. 5 is a diagram illustrating use modes of the disk drive apparatus of the present invention.

An example of a use mode in each of the above-described modes (1) to (4) is shown in FIG. 5. The use mode of an HDD by a portable camera which is battery driven is shown in the left side of FIG. 5, and it is a use mode corresponding to the above-described (4) PAV mode (Portable AV mode) in which a low-speed mode is selected. Also, the use mode of an HDD, in which an image editing process, using commercial power of AC 100 V, is performed by a computer, is shown in the right side of FIG. 5, and it is a use mode corresponding to the above-described (1) HIT mode (Home IT mode) in which a high-speed mode is selected.

The switching of the modes of the HDD is performed by receiving a "SET AV CONFIGURATION" command issued by a host. This command is defined at command number 80h as, for example, one of the vender-specific commands of the ATA standard.

Table 1 below schematically shows the data structure of an input register inside the HDC 203 when the "SET AV CONFIGURATION" command is issued. Table 2 below schematically shows the data structure of "SET AV CONFIGURATION" which is parameter data of the command. The indication of a mode is performed at "bit0" and "bit1" of "word0" within the data shown in Table 2 below.

TABLE 1

| Register | 7 | 6 | 5 | 4 | 3 | 2 | 1 | 0 |
|---|---|---|---|---|---|---|---|---|
| Features | | | | na | | | | |
| Sector Count | | | | na | | | | |
| Sector Number | | | | na | | | | |
| Cylinder Low | | | | na | | | | |
| Cylinder High | | | | na | | | | |
| Device/Head | obs | na | obs | DEV | | na | | |
| Command | | | | 80h | | | | |

TABLE 2

| Word | Content | | |
|---|---|---|---|
| 0 | Bit0 | IT/AV Mode | 0 = IT mode, 1 = AV mode |
| | Bit1 | Home/Portable Mode | 0 = Home mode, 1 = Portable mode |
| | Bit2–15 | Reserved | |
| 1 | Bit0 | Read continuous | 0 = off |
| | | | 1 = on |
| | Bit1–7 | Reserved | |
| 2 | Reserved | | |
| 3 | Reserved | | |
| 4 | Total error recover time limit per READ AV STREAM command [ms] | | |
| 5 | Total error recover time limit per WRITE AV STREAM command [ms] | | |
| 6–255 | Reserved | | |

The command code of the "SET AV CONFIGURATION" command is 80h, and as shown in Table 1, the command code 80h is written into the command register within the input register.

As shown in the "SET AV CONFIGURATION" in Table 2, "bit1" of "word0" is a bit which indicates whether the HDD 200 operates in the home mode or in the portable mode. The "SET AV CONFIGURATION" command issued from the host is received by the CPU-B 204 via the PC-card interface 150. The CPU-B 204 sets the disk rotation speed in an SPM control section 212 in accordance with an instruction of "bit1" of "word0" of that command so that a data rate corresponding to the number of revolutions of the disk is set in the recording channel circuit 206 and the reproduction channel circuit 207.

When bit1=0, the mode is a home mode, in which the disk rotation speed is set to be high in a manner similar to a conventional HDD, and a high data transfer rate is ensured.

When bit1=1, the mode is a portable mode, in which the disk rotation speed is set to be low, and the HDD can operate with a low power consumption. That is, since in this portable mode, the disk rotation speed is decreased to less than that in the home mode, less electric power to be supplied to the spindle motor (SPM) for driving the disk to rotate is required. In a conventional HDD whose rotation is high, of the total power consumption, the power consumption ratio occupied by the spindle motor reaches approximately ⅓, and generally, the power consumption of this SPM increases as a function of the rotation speed.

Figure 6:
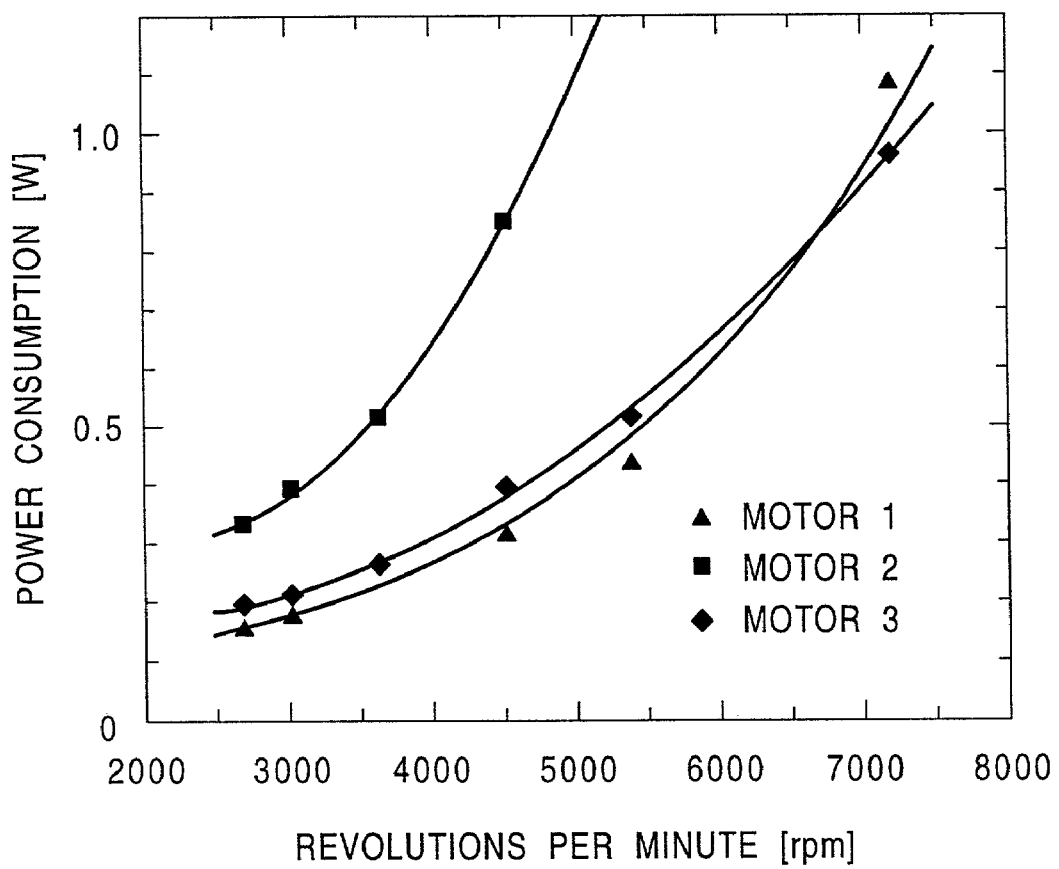
FIG. 6 is a diagram showing the relationship between the rotation speed of a disk and power consumption of a spindle motor.

FIG. 6 shows a relationship between power consumption of a spindle motor (SPM) and the rotation speed. As can be understood from FIG. 6, as a result of decreasing the number of revolutions of the disk from a high-speed rotation of 5400 rpm to a low-speed rotation of 2700 rpm, a large reduction in power consumption can be achieved.

As another power consumption component in the disk drive apparatus, there is a circuit which continuously performs data processing at several tens of Mbits/sec or more. Since the main portions of this circuit are usually realized by CMOS logic circuits, the power consumption thereof is proportional to the operating frequency. Therefore, by decreasing the number of revolutions of the disk and by decreasing the data rate, it is also possible to decrease the power consumption of these circuits.

As a result of reduction in the disk rotation speed in the manner as described above, reduction in not only the power consumption of a spindle motor (SPM), but also the power consumption of CMOS logic circuits, is realized. Therefore, according to this construction, it is possible, in practice, to use a battery-driven-type portable moving-image disk camera apparatus, which was difficult to use in practice, because the power consumption at the time of continuous data recording or playback exceeds 2 W when a conventional high-speed disk rotation HDD is used. Furthermore, another advantage is that, since rotation noise can be reduced due to a decrease in the disk rotation speed, by applying this construction to a portable moving-image disk camera, the amount of background noise can be reduced when sound is recorded, making it possible to record sound with a satisfactory S/N ratio.

In a construction for automatically identifying whether driving power is a battery or commercial power of AC 100 V, etc., in the case of driving by a battery, by issuing a command by setting bit1 of word0 of the "SET AV CONFIGURATION" command to 1, it is possible to shift to a low-speed mode in which low power consumption is realized. In the case of this power identification construction, the construction is formed in such a way that a command is issued by setting bit1 of word0 of the "SET AV CONFIGURATION" command to 0 when commercial power is used and to 1 when a battery is used in response to the switching of the power.

Next, error handling in each operation mode of an HDD of the present invention is described. "Bit0" of "word0" of the "SET AV CONFIGURATION" command functions as a bit for indicating whether the operation, such as error handling of the HDD, data flow control, etc., is in the IT mode or in the AV mode. The HDD receives the "Set-AV-Configuration" command from the host via the PC-card interface 150, and the command is interpreted by the CPU-B 204. The CPU-B 204 supplies an instruction to each section of the HDD in accordance with the instruction of "bit1" of "word0" of that command, so that appropriate error handling is performed.

When bit0=0, the HDD 200 is in the IT mode, in which satisfactory error handling which places importance on data reliability rather than on real-time characteristics is performed in a manner similar to that for a conventional HDD. For recording and playback of data in the IT mode, a write command, which is a normal write command, and a read command, which is a normal read command, defined by the ATA standard, are used. In the IT mode, for example, if a data playback error occurs, first, an error-correction code decoder of the HDC 203 detects a correction impossible error, the CPU-B 204 instructs the HDC 203 and the reproduction channel circuit 207 to retry a playback operation, and retries are repeated until the playback is terminated without errors. Therefore, although the reliability of played-back data is high, since clusters which follow cannot be played back until retries are completed, real-time continuity cannot be ensured, and this is not suitable for playback of a moving image.

On the other hand, when bit0=1, the mode is the AV mode, in which error handling which places importance on real-time continuity, unlike in a conventional HDD, is performed. More specifically, in the data of Table 2 described above, "word4" and "word5" indicate a maximum error handling time permitted for playback and recording at one time, respectively. When the time required for error handling exceeds the indicated time, the error handling, such as retries, is stopped, and the process goes to a playback and recording operation of sectors which follow.

With the above-described error-handling time limitation construction, since a host can estimate in advance the time required for one recording and playback operation, real-time continuous recording and playback of moving-image information and sound information is possible. In particular, at the time of playback, by further setting "bit0=1" in "word1" of the "SET AV CONFIGURATION" command, setting can be performed so that a "Read Continuous" operation is performed for transferring to the host the data of the sector, in which error handling cannot be completed within a set time.

Figure 7:
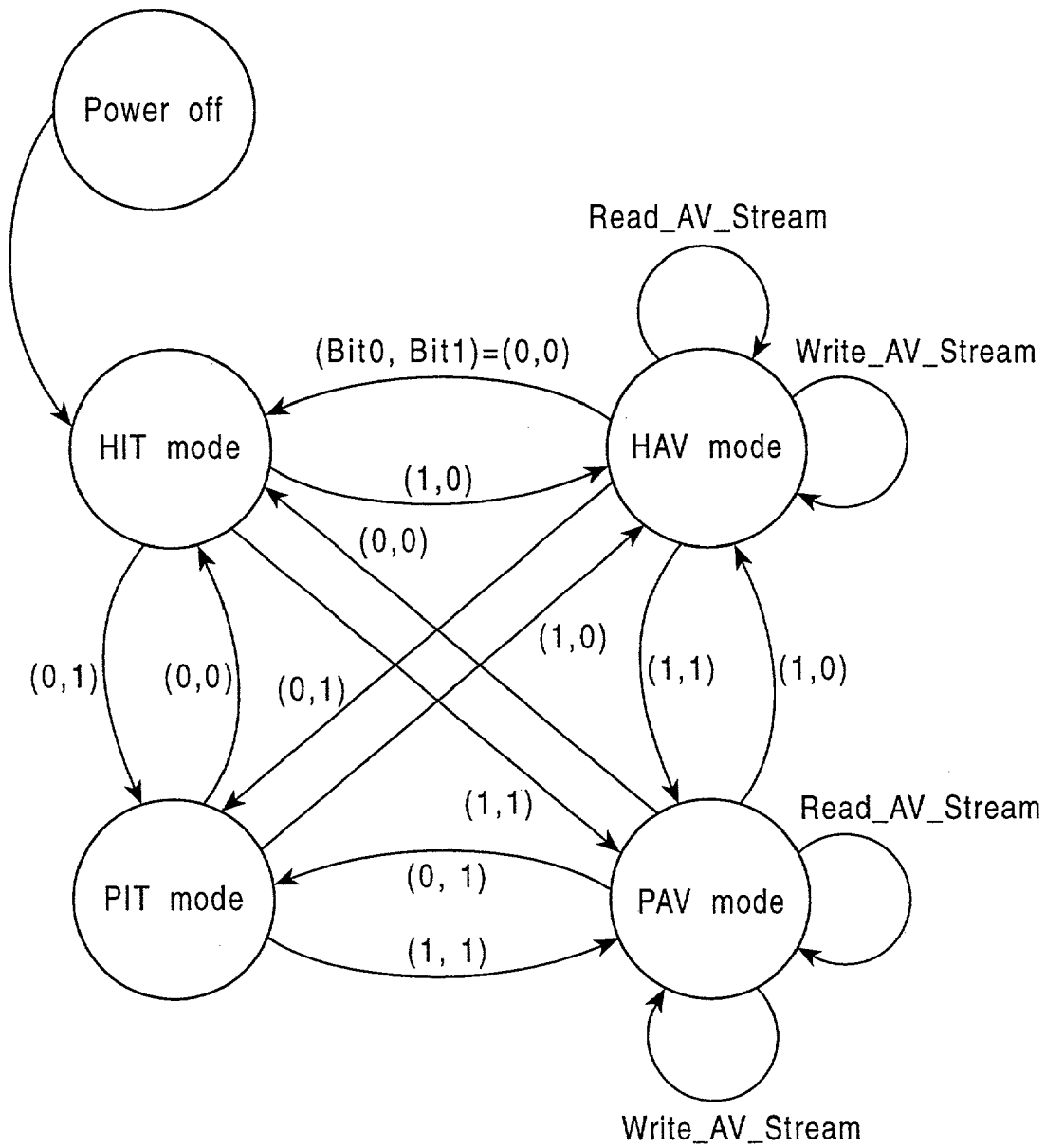
FIG. 7 is a diagram showing an operation mode switching diagram (part 1) of the disk drive apparatus of the present invention.
Figure 8:
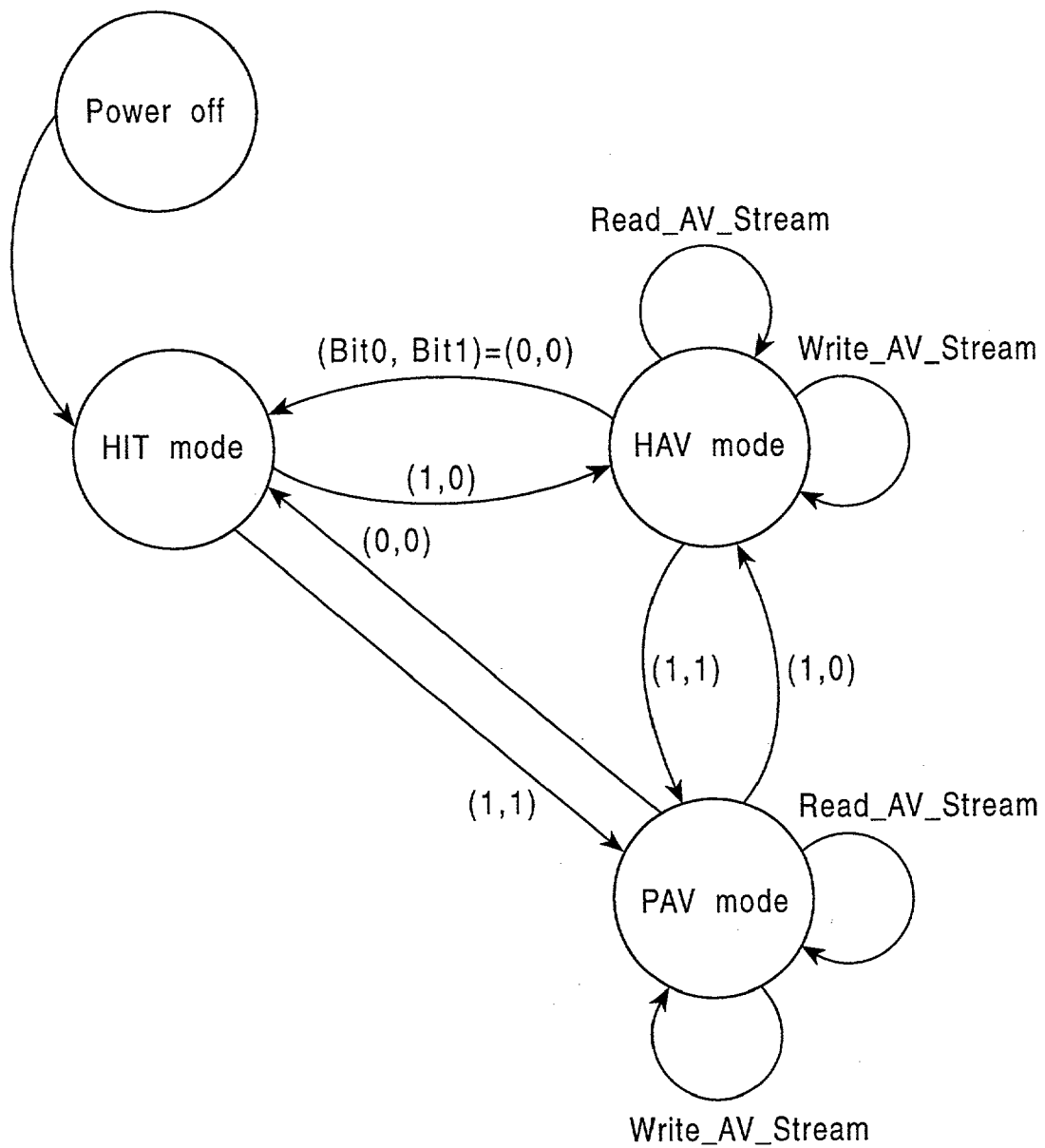
FIG. 8 is a diagram showing an operation mode switching diagram (part 2) of the disk drive apparatus of the present invention.
Figure 9:
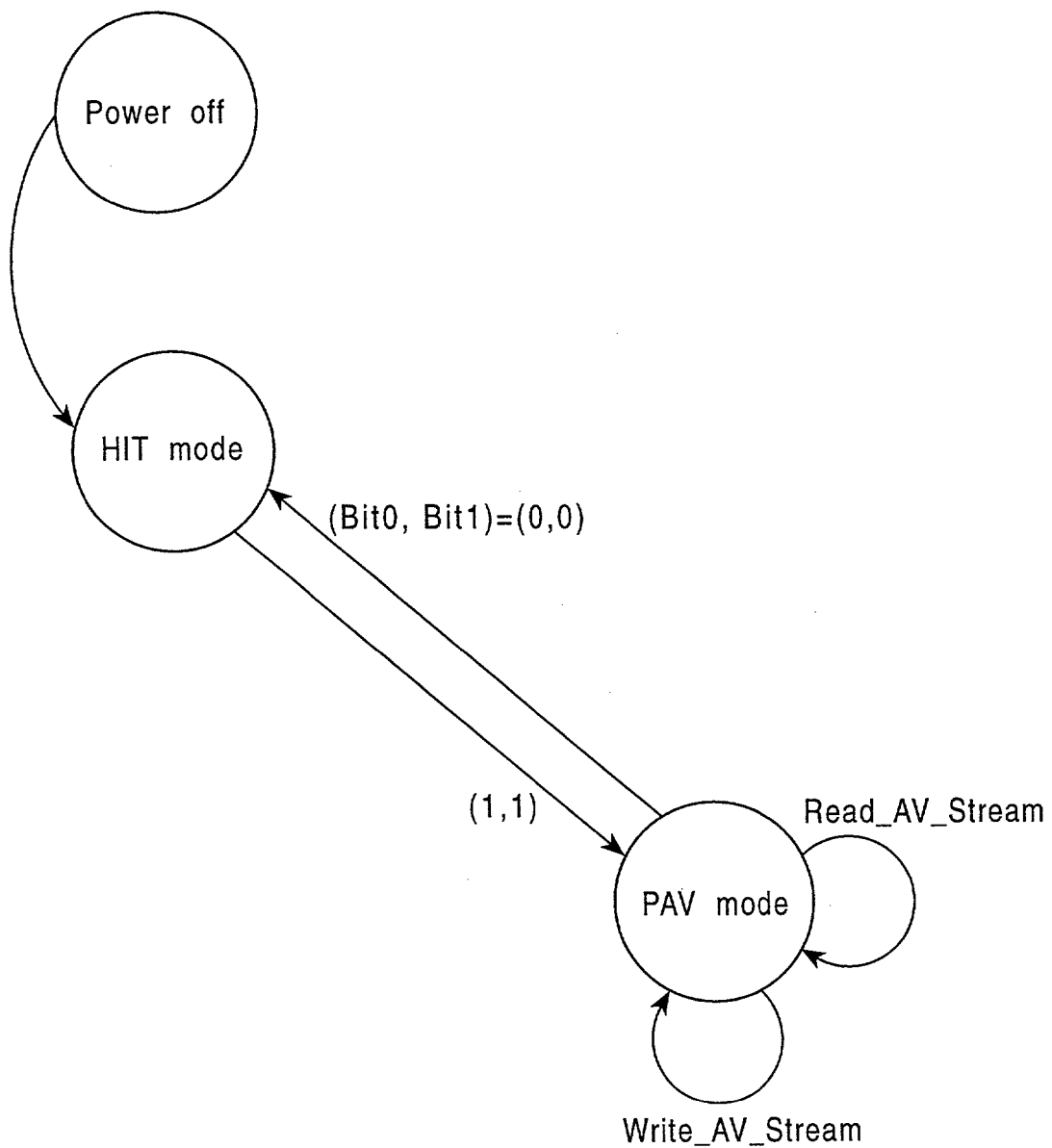
FIG. 9 is a diagram showing an operation mode switching diagram (part 3) of the disk drive apparatus of the present invention.

FIGS. 7 to 9 show operation mode switching diagrams of the HDD 200 according to this embodiment. FIG. 7 is an operation mode switching diagram in a system having the above-described four operation modes. FIG. 8 is an operation mode switching diagram in a system having three operation modes, excluding the PIT mode. FIG. 9 is an operation mode switching diagram in a system having only the HIT mode and the PAV mode. Referring to FIG. 7 regarding the operation mode switching in a system having the four operation modes, the operation of the HDD 200 is described below.

When the power is switched on, the HDD 200 starts first in the HIT mode. A host (more exactly, the CPU-A 115 which executes the HDD driver) issues a "SET AV CONFIGURATION" command to the HDD 200 in order to switch modes. The instruction of the mode is performed on the basis of the values of "bit0" and "bit1" of "word0" within the data shown in Table 2.

In the HIT and PIT modes, a normal read command and a normal write command, defined by the conventional ATA standard, are used to instruct recording and playback of computer data into and from the HDD 200.

In contrast, in the HAV and PAV modes, each of a "Read AV stream" command and a "Write AV stream" command is used to instruct recording and playback of an AV data stream into and from the HDD 200.

A group of static parameters necessary for executing these two recording and playback commands in the HAV and PAV modes are set by the "Set AV Configuration Data" shown in Table 2. That is, word4 of the data content thereof instructs, to the HDD 200, the maximum permissible value of the error handling time at the time of executing the "Read AV stream" in the AV mode in units of milliseconds. In a similar manner, word5 of the data content instructs, to the HDD 200, the maximum permissible value of the error handling time at the time of executing the "Write AV stream" in units of milliseconds.

When the host (more exactly, the CPU-A 115 which executes the HDD driver) sets the HDD 200 to the AV mode, the HDC 203 inside the HDD 200 and the CPU-B 204 store the maximum error handling processing time in a case where one "Write AV stream" command is executed, in accordance with the content of word5 of the "Set AV Configuration Data" content.

Examples of causes of errors at the time of executing the recording command, that is, the "Write AV stream" includes a seek error to a track in which a recording object sector is present, off-track of a head due to vibration and impact during recording, and abnormality of a recording head during recording. In the case of a seek error, since a re-seek to an original target track, for example, from the erroneously arrived track is necessary, an error handling processing time of several milliseconds is required. Also, in the case of off-track and abnormality of a head, since data recording is retried after waiting for a rotation until the head 215 reaches again the corresponding sector, an error handling processing time including a latency time (for example, when the rotation frequency is 90 Hz, 11.1 msec) is necessary.

In a case where such an error occurs while the recording command is being executed and a recovery process is performed, the CPU-B 204 measures the time until these error handling processes are terminated by using a timer. Then, when the maximum error handling time specified in the "Set AV Configuration Data" is exceeded, the error handling is stopped, and the process proceeds to the execution of a recording or playback command which follows. As a result, the real-time continuity regarding recording or playback data which follows is ensured.

Also, when the host sets the HDD 200 to the AV mode, in a similar manner, the HDC 203 inside the HDD 200 and the CPU-B 204 store the maximum error handling time in a case where one "Read AV stream" command is executed, in accordance with the content of word4 of the "Set AV Configuration Data" content.

Also, examples of errors which occur at the time of executing the playback command, that is, the "Read AV stream", include a seek error to a track in which a playback object sector is present, and a data detection error during playback. The CPU-B 204 measures the time from when this error occurs until the processing is terminated by using a timer. Then, when the maximum error handling time specified in the "Set AV Configuration Data" is exceeded, the error handling is stopped, and the process proceeds to the execution of a recording or playback command which follows. As a result, the real-time continuity regarding recording or playback data which follows is ensured.

In the manner as described above, as a result of providing an upper limit for the error handling time, it is possible to appropriately prevent a situation in which one error handling is prolonged, and execution of a command which follows is delayed, causing an obstacle in the real-time continuity of the AV data stream.

Although in the above description, the parameter "Set AV Configuration Data" of the AV mode setting command is formed so as to specify the maximum permissible time for error handling for each of recording and playback in units of milliseconds, it is a matter of course that the same operation/working-effects can be obtained even if the time is specified and measured in other units (for example, microseconds).

A description will now be given of measures to be taken in a case where the "SET AV CONFIGURATION" command is issued to the HDD 200, and after a recording or playback operation of the AV data stream is started, the maintenance of real-time continuity becomes difficult for some reason.

For example, there is a situation in which errors occur continuously at a higher level than are assumed by the host while continuous recording or playback commands are being executed, and a maximum permissible time is spent for each error handling. In such a situation, the amount of playback data stored in the buffer memory of the HDD 200 and the host memory 112 becomes zero, the required average data rate cannot be satisfied, and the quality of a moving image to be played back is degraded.

As a simple measure for improving such a situation, a means is provided for indicating the urgency of the execution of that command in individual AV recording and AV playback commands without newly issuing the "SET AV CONFIGURATION" command.

In Table 3 below, the data structure of the input register inside the HDC 203 at the time of issuing the "Read AV stream" command is schematically shown.

TABLE 3

| Register | 7 | 6 | 5 | 4 | 3 | 2 | 1 | 0 |
|---|---|---|---|---|---|---|---|---|
| Features | URG | DMA | | na | | | Stream ID | |
| Sector Count | | | | Sector count | | | | |
| Sector Number | | | | Sector number or LBA | | | | |
| Cylinder Low | | | | Cylinder number or LBA | | | | |
| Cylinder High | | | | Cylinder number or LBA | | | | |
| Device/Head | obs | LBA | obs | DEV | Head number or LBA | | | |
| Command | | | | 81h | | | | |

The command code of the "Read AV stream" command is 81h, and as shown in Table 3, the command code 81h is written into the command register in the input register.

The bit position 7 (URG) of the feature register in the input register is defined as an urgent bit indicating the urgency of command processing. When the bit URG is "1", this shows that the execution of that command has a high level of urgency. In this case, the HDD 200 temporarily ignores the maximum error processing permissible time set by the command parameter of the "SET AV CONFIGURATION" so as to shorten the error handling time in the playback operation of the command as much as possible. Specifically, only a correction process by error-correction code, which scarcely requires a processing time, is performed, and a process requiring time, such as a retry, is not performed. As a result, by shortening the execution time of the playback operation, it is possible to circumvent an urgent situation in which the real-time continuity of the AV data stream is lost.

When the playback data stored in the host memory 112 reaches a sufficient amount and the urgent situation is resolved, the host sets this urgent bit (URG) to 0 when a "Read AV stream" command which follows is issued. As a result, the error handling time permitted for the HDD 200 returns to the maximum permissible value which was previously set in the parameter "Set AV Configuration Data" of the "SET AV CONFIGURATION" command.

In Table 4 below, the data structure of the input register inside the HDC 203 at the time of issuing the "Write AV stream" command is schematically shown.

TABLE 4

| Register | 7 | 6 | 5 | 4 | 3 | 2 | 1 | 0 |
|---|---|---|---|---|---|---|---|---|
| Features | URG | DMA | | na | | | Stream ID | |
| Sector Count | | | | Sector count | | | | |
| Sector Number | | | | Sector number or LBA | | | | |
| Cylinder Low | | | | Cylinder number or LBA | | | | |
| Cylinder High | | | | Cylinder number or LBA | | | | |
| Device/Head | obs | LBA | obs | DEV | Head number or LBA | | | |
| Command | | | | 82h | | | | |

The command code of the "Write AV stream" command is 82h, and as shown in Table 4, the command code 82h is written into the command register in the input register.

Also, the bit position 7 (URG) of the feature register in the input register is defined as an urgent bit indicating the urgency of command processing. When the bit URG is "1", this indicates that the execution of that command has a high level of urgency. The urgency at the time of recording by the disk recorder becomes high when the output data of the AV encoder, stored in the host memory 11, is overflowing in excess of the set memory limit. When URG=1, in the HDD 200, error handling, such as retries, requiring time, is not performed. As a result, the data stored in the host memory 112 is recorded quickly in the HDD 200, and an urgent situation in which the continuity of a data stream is interrupted can be resolved.

Next, the four operation modes in the disk drive apparatus of the present invention are described below individually.

[Outline of Operation in the PAV Mode]

A PAV mode is described below as a first representative operation mode in the disk drive apparatus of the present invention.

In a case where the disk camera is battery driven, for the reasons described below, the host issues a "SET AV CONFIGURATION" command to the HDD 200 so that the HDD 200 operates in the PAV mode.

Figure 10:
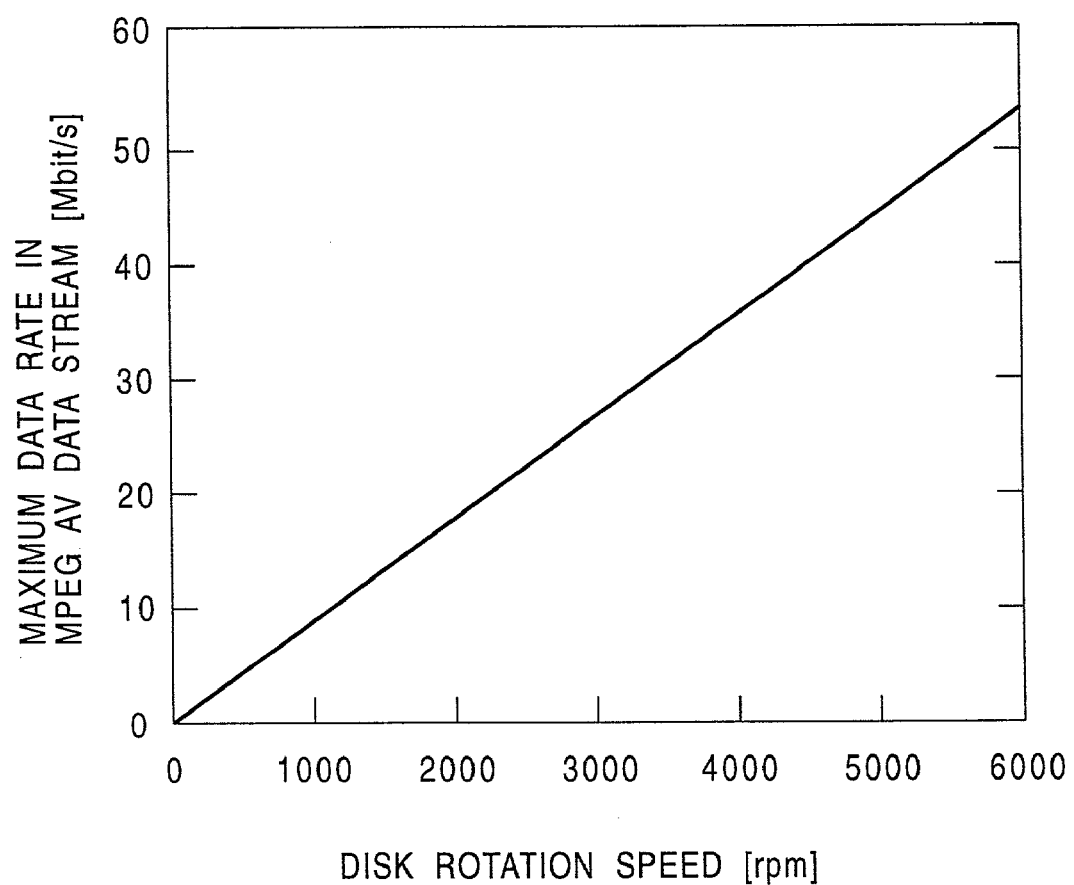
FIG. 10 is a diagram illustrating correspondence between the disk rotation speed and data rate of an MPEG AV data stream.

When the HDD is set to the PAV mode, by decreasing the disk rotation speed, for example, from a high-speed rotation of 5400 rpm to 2700 rpm, power consumption of the spindle motor, etc., is reduced in a manner as described above. In this case, if the line recording density of data on the disk surface is the same, the data rate in the same radius is also decreased, but a speed necessary for recording a still image or a compressed moving image, and compressed sound information can be secured. FIG. 10 is a diagram in which the disk rotation speed (rpm) of a disk is shown on the horizontal axis, and the maximum data rate (Mbits/sec) of an MPEG-AV data stream, which can be achieved at each rotation speed, is shown on the vertical axis. As conditions, the disk diameter suitable for a PC-card-type HDD is assumed to be 1.8 inches, and the line recording density thereof is assumed to be 250 kbpi as a value possible for the head disk at the present time. Also, the inter-track head movement time is assumed to be 3 ms which is an ordinary value, and the occurrence of errors in head movement and in playback operation is not considered here.

It can be seen from FIG. 10 that, for example, the achievement of an average data rate of 4 to 8 Mbits/sec in the MPEG2 method, which is a typical digital moving-image compression method, is possible at a low rotation speed of approximately 1000 rpm. Of course, in a case where the rotation speed is decreased too much, the relative speed between the head and the disk becomes too low, and a problem may occur in that head floating using a slider, which is a feature of the HDD, becomes unstable. However, in the case of a rotation speed of 2700 rpm, which is mentioned in the above example, stable head floating can be ensured even with a 1.8-inch-diameter disk. Although in this embodiment, the low rotation speed is 2700 rpm, the rotation may be even slower as long as it is a speed at which stable head floating is possible, data recording and playback can be performed stably, and no problem is posed in data recording and playback.

In head movement and in a recording operation, when an error occurs, time is necessary for handling it. Therefore, if a long time is permitted for error handling, the average data rate is decreased to less than a value necessary for MPEG2 playback, causing a problem in that a moving image which follows cannot be recorded. This problem is described below by using an example of a data recording operation in the AV mode in FIG. 4 described above.

The operation of the HDD shown in the middle portion of FIG. 4 is an example of an HDD operation in a case where one AV data stream is recorded in an HDD which is set to the PAV mode in which the data rate is low. Each cluster has an amount of data for 245 sectors, and for the sake of simplicity, it is assumed that one cluster is continuously recorded on one track on the disk, and a head seek operation is not necessary.

For a cluster (k, 1), when the host issues a "Write AV stream" command to the HDD, in the HDD, the command is received, the head is made to seek (S1) the target track, the arrival at the target start sector is awaited, and recording of 245 sectors of the cluster (k, 1) is performed (W1).

After the recording is completed normally, the HDD returns the termination message to the host, and there is an idle time (E1) until the scheduled recording start time of the next sector.

For a cluster (k, 2), since initially a seek (S2A) to the target track fails, and the seek is retried (S2B), time is wasted. Thereafter, 245 sectors are continuously recorded, and recording can be completed even though there is hardly any idle time (E2).

For a cluster (k, 3), since the recording operation is interrupted because the head positioning error is excessive, waiting for the positioning to become normal must be performed and furthermore, rotation latency (S3B) of the start portion of the sector which follows is required. Since the maximum error handling time provided by word5 of the "SET AV CONFIGURATION" command is exceeded, the error handling is cancelled, and the process proceeds to the recording operation of a cluster (k, 4) which follows. In the manner as described above, since in the portable mode the data rate is low and the idle time is short even in the case of normal termination, there are cases in which real-time continuity required by a moving image, etc., cannot be ensured unless the prolonged error handling is cancelled in the provided maximum time so as to start a recording operation for clusters which follow.

For the cluster (k, 4), the operation is completed normally in a manner similar to that for cluster (k, 1). Therefore, recording of the clusters which follow is performed without the real-time characteristics being lost due to the error handling time limitation function of the AV mode.

The maximum permissible error handling time provided by the "SET AV CONFIGURATION" command is determined by various design parameters of an HDD, a continuous average data rate of an AV data stream, etc. If the necessary continuous average data rate is denoted as Rate, the radius of the innermost circumference of the HDD as Rid, the line recording density as Ld, the track use efficiency as e, the head movement time between adjacent tracks as Tjmp, and the rotation speed as fr, the maximum permissible value Terr of the error handling time can be given based on equation (1) of the following equation, where $\pi$ is the ratio of the circumference of a circle to its diameter:

$$Terr = 2\pi \cdot (Rid) \cdot (Ld) \cdot (e/\text{Rate}) - Tjmp - 1/fr \qquad (1)$$

Figure 11:
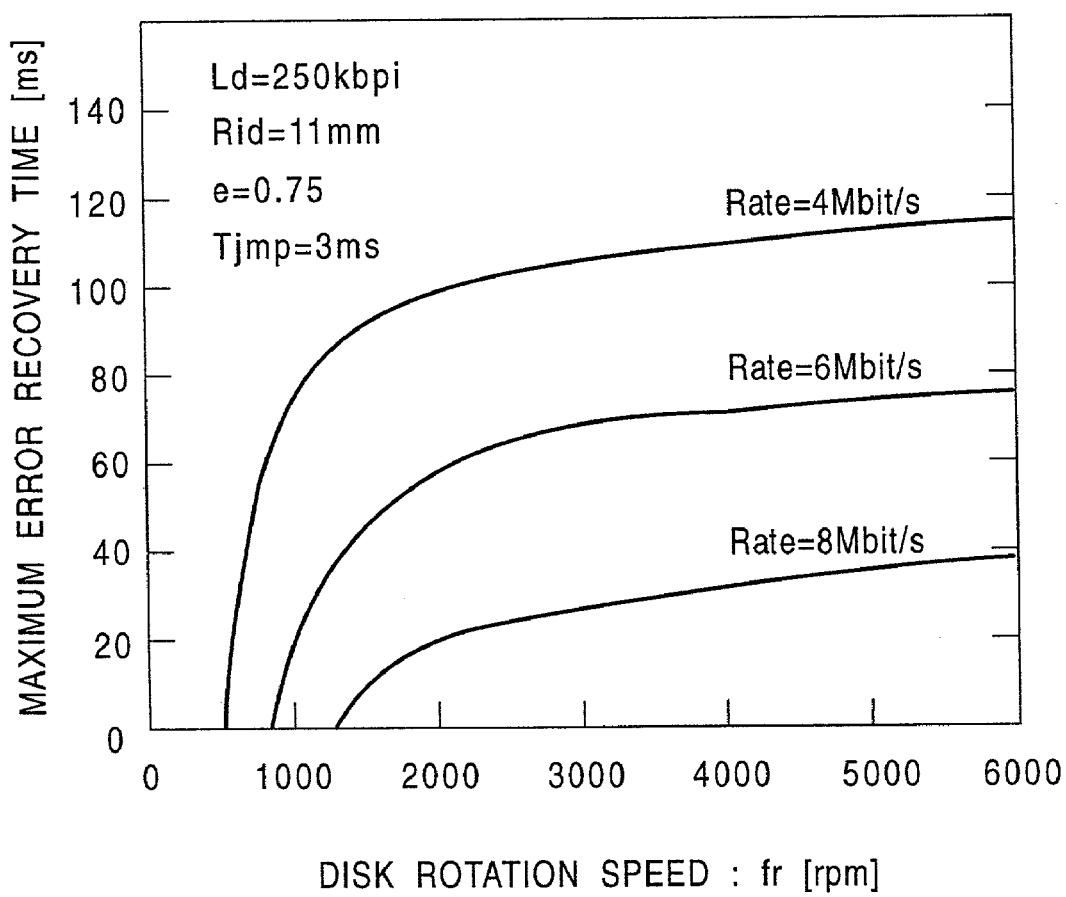
FIG. 11 is a diagram illustrating correspondence between the disk rotation speed and maximum error recovery time.

As a typical example, a result is shown in FIG. 11, in which the maximum permissible value of the error handling time is plotted as a function of the rotation speed fr under the conditions in which the line recording density Ld=250 kbits/inch, the track use efficiency e=0.75, and Tjmp=3 ms when the radius Rid of the innermost circumference of a 1.8-inch HDD=11 mm. For example, in a case where the average rate of the AV data stream is 8 Mbits/sec, if the rotation speed fr=2700 rpm, the maximum permissible value of the error handling time is 38.5 ms. Therefore, error handling, such as recovery of an error of head movement between adjacent tracks, and waiting for one rotation by one circumference is done for an error during recording so as to perform recording again, is possible.

In the manner as described above, if conditions, such as design parameters of the drive and the operating speed, are known, it is possible to calculate the maximum permissible value of the error handling time in advance. The host can permit error handling to the greatest extent practicable in a range in which the continuous average data rate can be ensured by indicating that value in word4 and word5 of the "SET AV CONFIGURATION" command (see Table 2).

In the foregoing, the recording operation in the PAV mode is described. Also when playback is performed in the PAV mode, setting to a low number of revolutions of the disk and a limitation on the error handling time are performed at the same time as during recording. Examples of the use of this PAV mode include a case in which playback of a moving image is performed on a monitor incorporated into a disk camera which is battery driven, and a case in which a recorded PC-card HDD is inserted into a notebook-type personal computer which is battery driven and a moving image is played back.

Therefore, in the PAV mode, at the same time as the power consumption decreases due to the low revolution rate of the disk, real-time continuity required for AV is ensured by error handling on which a time limitation is imposed, and therefore, the PAV mode may be said to be a mode suitable for a camera which is battery driven.

[Outline of Operation in the HIT Mode]

The HIT mode will now be described as a second representative operation mode in the disk drive apparatus of the present invention.

The HIT mode is a mode which is most appropriate in a case where a moving image photographed while carrying a disk camera to which the construction of the present invention is applied is edited by driving, for example, a personal computer by commercial power of AC 100 V, etc. The HIT mode is a mode which is most appropriate in a case where, for example, as shown in FIG. 5, after a photographed image is recorded in a PC-card HDD which can be mounted into and removed from the disk camera, the PC-card HDD is removed, and it is inserted into the PC-card slot of a desktop-type computer which can be driven by commercial power, so that a recorded image is read and is edited, or is transferred to another storage apparatus.

In a case where an image editing process is performed by a personal computer by receiving the supply of power from the AC 100-V power supply, shortening of a transfer time and an editing time by a high data transfer rate is more important than decreasing power consumption. It is also preferable that data reliability be high. In such a case, the host issues a "SET AV CONFIGURATION" command to the HDD 200 so that the HDD 200 operates in the HIT mode. As can be understood from the operation mode switching diagrams shown in FIGS. 7 to 9, switching to the HIT mode is performed by issuing a "SET AV CONFIGURATION" command in which the bits of word0 of the "SET AV CONFIGURATION" command are set to "bit0=0 and bit1=0".

For example, when switching from the low-speed rotation mode of the PAV mode to the HIT mode is performed, in the HDD, a data transfer rate twice as great as that of the PAV mode is realized by increasing the disk rotation speed to, for example, 5400 rpm. In the error handling in the HIT mode, since retries to the greatest extent practicable are performed until the recording or playback operation is completed correctly in a manner similar to that of a conventional HDD, high data reliability can be ensured. Therefore, in an editing operation, etc., for example, even if a process for repeating a dubbing process for a moving image is performed, the degradation of image quality does not occur. In this PAV mode, the error recovery time limitation of word4 and word5 of the "SET AV CONFIGURATION" command shown in Table 2 is not applied, and retries to the greatest extent practicable are performed until the recording and playback operation is completed correctly.

This higher data rate in the HIT mode yields advantages, for example, such as those described below.

For example, in a case where the HDD recording capacity of a disk camera is 2 GB, if the compression method is an MPEG2 method in which the average data rate is 8 Mbits/sec, a moving image 2000 seconds long can be recorded on an HDD, and to transfer this image as it is to the computer requires 2000 seconds. In comparison, if the number of revolutions of the disk is increased by setting the HDD to a high-speed mode and, for example, 50 Mbits/sec is secured as an average transfer rate, and transfer can be completed in 160 seconds, making it possible to complete data processing on a computer, such as editing, or a process such as long-term storage in a file server, in a short time.

Of course, since each operation in the HIT mode is similar to that of the conventional HDD, it is suitable for recording and playback, and editing processing not only for moving-image and sound information, but also for text data.

[Outline of Operation in the HAV Mode]

As a third operation mode in the disk drive apparatus of the present invention, the HAV mode is described below.

Even in a case where driving by commercial power is possible and the number of revolutions of the disk can be set to be high, when ensuring of real-time characteristics is desired at the time of recording and playback, an operation in the HAV mode is suitable.

The host issues a "SET AV CONFIGURATION" command to the HDD 200 so that the HDD 200 operates in the HAV mode. As can be understood from the operation mode switching diagrams shown in FIGS. 7 and 8, the switching to the HAV mode is performed by issuing a "SET AV CONFIGURATION" command in which the bits of word0 of the "SET AV CONFIGURATION" command are set to bit0=1 and bit1=0.

In the HAV mode, the disk rotation speed becomes a high-speed rotation mode of 5400 rpm. However, an upper limit on the error recovery time of word4 and word5 of the "SET AV CONFIGURATION" command is applied, and the real-time characteristics at the time of recording and playback are ensured. Therefore, in a manner similar to the PAV mode, the HDD operation during error handling is the same procedure as that shown in FIG. 4. The following processing is performed, for example, if time runs out during error handling, the error handling is cancelled, and the process proceeds to a recording or playback operation for clusters which follow.

For example, in a case where two AV data streams recorded in a PC-card HDD are played back at the same time, even if the number of revolutions is twice as great as that of the portable mode, error handling for a long time still cannot be permitted. In this case, real-time continuity can be ensured by forming a construction such that the error handling time is set to the maximum time in advance, and when the value is exceeded, the error handling is cancelled, that is, by forming this HAV mode.

[Outline of Operation in the PIT Mode]

As a fourth operation mode in the disk drive apparatus of the present invention, the PIT mode is described below.

When the mode is changed to the PIT mode, the host issues a "SET AV CONFIGURATION" command to the HDD 200 so that the HDD 200 is placed in the PIT mode. As can be understood from the operation mode switching diagram shown in FIG. 7, the switching to the PIT mode is performed by issuing a "SET AV CONFIGURATION" command in which the bits of "word0" are set to bit0=0 and bit1=1.

In a case where the HDD 200 is battery driven and ordinary information, rather than information requiring real-time continuity, such as a moving image, is recorded or played back as data, the PIT mode is suitable. It is a mode suitable for a case where, for example, a PC-card HDD is inserted into a notebook-type personal computer and is used.

In this PIT mode, the disk rotation speed is set to a low-speed rotation, that is, 2700 rpm which is half of the 5400 rpm during normal rotation. Therefore, the amount of power consumed is reduced. However, an error recovery time limitation of word4 and word5 of the "SET AV CONFIGURATION" command is not applied, and retries to the greatest extent practicable are performed until the recording or playback operation is completed correctly. In this PIT mode, the reliability at the time of recording and playing back data is high, and the PIT mode is a mode which is most appropriate for a case where ordinary data processing other than recording and playback of a moving image is performed by battery driving.

As has thus been described, according to the construction of the present invention, it is possible to appropriately select four operation modes according to various use modes, and an HDD can be made to perform the most appropriate operation with respect to power consumption and real-time continuity of recording and playback.

As can be understood from the operation mode switching diagrams shown in FIGS. 7 to 9, in a case where all four modes are not used, the construction may be formed in such a way that a mode change is possible among only three or two modes. By forming the construction in such a way that the disk rotation speed differs and an error handling mode differs in at least two operation modes, appropriate performance can be ensured in various use modes, such as recording and playback of continuous information such as moving-image information and sound information, portable use by battery driving, and data processing requiring high data reliability.

In the foregoing, the present invention has been described in detail by referring to the specific embodiments. However, it is obvious that a person skilled in the art can modify and substitute the embodiments without departing from the spirit and scope of the present invention.

For example, in this specification, the embodiments of the present invention are described in accordance with examples in which a disk drive apparatus is applied to a digital disk camera. The gist of the present invention is not limited to this example. For example, the present invention can be suitably applied to a disk drive apparatus of a type which is connected to a general-purpose computer system by means of extended IDE, SCSI, or other interfaces. Also, although in the above-described embodiments only two modes of 5400 rpm and 2700 rpm are described for the disk rotation speed, a disk rotation mode at a lower speed or at a higher speed may be provided.

In summary, the present invention has been disclosed in a form of examples, and those should not be construed as being limitations. To determine the gist of the present invention, the claim section should be taken into consideration.

As has thus been described in detail, according to the present invention, it is possible to provide a superior disk drive apparatus, a superior video camera apparatus, and a superior data processing method for use with the disk drive apparatus, which are capable of performing processing suitable for recording and playback of an AV data stream requiring real-time characteristics.

According to the present invention, the construction is formed in such a way that the disk rotation speed is reduced in an HDD-incorporated system, which is battery driven, as in a portable system, thus making it possible to achieve low power consumption and to realize use for an extended period of time.

According to the present invention, it is possible to provide a superior disk drive apparatus, a superior video camera apparatus, and a superior data processing method for use with the disk drive apparatus, which ensure real-time continuity for a video recorder, which increase the number of AV data streams which can be recorded and played back at the same time, the average data rate, etc., and which enable high-speed recording and playback of high-quality AV data.

According to the present invention, by allowing a limitation on the error handling time, the disk apparatus can have an operation mode suitable for recording and playback of moving-image data and sound data requiring real-time continuity. Therefore, it is easy for the host having incorporated therein the disk apparatus to control real-time continuity.

The disk apparatus according to the present invention is a disk apparatus which performs data processing in accordance with a use mode in a case where discrete data in computer uses is handled and in a case where real-time continuous information, such as a moving image and sound information, is handled. Therefore, according to the disk apparatus of the present invention, it is possible to provide a superior disk drive apparatus, a superior video camera apparatus, and a superior data processing method for use with the disk drive apparatus, which perform the most appropriate operation in either use mode.

What is claimed is:

1. A disk drive apparatus containing a plurality of operation modes, comprising:
   a first mode having a first data rate and error processing for a first data reliability independent of a time duration for error processing;
   a second mode having a second data rate and error processing for the first data reliability independent of the time duration for error processing;
   a third mode having the first data rate and error processing for a second data reliability dependent on the time duration for error processing; and
   a fourth mode having the second data rate and error handling for the second data reliability dependent on the time duration for error processing,
   wherein the first data rate is higher than the second data rate,
   wherein the first data rate uses a higher power and a higher disk rotation speed than the second data rate; and
   wherein the first data reliability is higher than the second data reliability.

2. A disk drive apparatus according to claim 1, wherein the error handling method in said third and fourth operation mode is an error handling method in which an upper limit of an error handling time for recording or playback of real-time continuous information is determined.

3. A disk drive apparatus according to claim 2, wherein in said third and fourth operation mode, when error handling is not completed within the upper limit of said error handling time, the error handling is stopped, and a recording or playback process for data which follows is performed.

4. A disk drive apparatus according to claim 2, wherein the upper limit of said error handling time can be set by an attached host device.

5. A disk drive apparatus according to claim 1, wherein said disk drive apparatus can be battery driven, and when said disk drive apparatus is battery driven, the disk drive apparatus operates in a second or fourth operation mode in which the disk rotation speed is set to be low.

6. A disk drive apparatus according to claim 1, wherein said disk drive apparatus can be connected to a host system via a host interface, performs a recording or playback operation onto or from a disk in accordance with a recording or playback command received via said host interface, and switches among different operation modes in accordance with a command containing operation mode specification, which is received via the host interface.

7. A disk drive apparatus according to claim 6, wherein the command containing said operation mode specification is a command added in accordance with the ATA (AT-Attachment) standard prepared by the ANSI (American National Standards Institute).

8. A disk drive apparatus according to claim 6, wherein the command containing said operation mode specification is a command added in accordance with the PC card ATA (AT-Attachment) standard defined by the PCMCIA (Personal Memory Card International Association)/JEIDA (Japan Electronics Industry Development Association).

9. A disk drive apparatus according to claim 1, wherein said disk drive apparatus is a removable disk apparatus from which a mounted disk can be removed.

10. A disk drive apparatus according to claim 1, wherein the outer dimensions and the connector construction of said disk drive apparatus are in compliance with the PC card standard defined by the PCMCIA/JEIDA.

11. A disk drive apparatus according to claim 1, wherein said disk drive apparatus performs positioning control of a head with respect to a disk on the basis of servo information in accordance with a sector servo method of sectors provided radially by partitioning the data recording surface of the disk.

12. A disk drive apparatus according to claim 11, wherein said disk drive apparatus has a synchronous head position detection construction for generating a servo clock on the basis of said servo information recording area and for detecting head position information while referring to the generated clock.

13. A disk drive apparatus according to claim 1, wherein said disk drive apparatus comprises:
    an information compression unit for compressing information; and
    an information decompression unit for decompressing compressed information, wherein
    information compressed by said information compression unit is recorded on a disk loaded into said disk drive apparatus, and when compressed information is played back from the disk, a decompression process for decompressing information is performed by said information decompression unit.

14. A disk drive apparatus according to claim 13, wherein information compressed by said information compression unit contains moving-image information.

15. A disk drive apparatus according to claim 14, wherein the moving-image information is moving-image information compressed by the MPEG2 (Motion Picture Experts Group Phase 2) method.

16. A disk drive apparatus according to claim 1, wherein said disk drive apparatus has a camera for photographing an image, and the image information obtained by the camera is recorded on a disk loaded in said disk drive apparatus.

17. A video camera apparatus containing a disk drive apparatus according to claim 1.

18. A data processing method for use with a disk drive apparatus having a plurality of operation modes, comprising:
    a first mode having a first data rate and error processing for a first data reliability independent of a time duration for error processing;
    a second mode having a second data rate and error processing for the first data reliability independent of the time duration for error processing;
    a third mode having the first data rate and error processing for a second data reliability dependent on the time duration for error processing;
    a fourth mode having the second data rate and error handling for the second data reliability dependent on the time duration for error processing,
    wherein the first data rate is higher than the second data rate,
    wherein the first data rate uses a higher power and a higher disk rotation speed than the second data rate; and
    wherein the first data reliability is higher than the second data reliability,
    setting to the third and fourth operation mode on the basis of mode information contained in a command received by said disk drive apparatus, to which an error handling method appropriate for performing recording or playback of real-time continuous information is made to correspond; and
    measuring the duration of error handling for an error which occurs at the time of recording or playback of data onto or from a disk, and when the error handling is not terminated within an upper-limit time contained in said command, stopping the error handling and performing a recording or playback process for data which follows.

* * * * *